US012421372B2

(12) United States Patent
Metzsch-Zilligen et al.

(10) Patent No.: US 12,421,372 B2
(45) Date of Patent: Sep. 23, 2025

(54) METHOD OF STABILIZING VIRGIN THERMOPLASTIC MATERIAL AND STABILIZED PLASTICS COMPOSITIONS, MOULDING COMPOUNDS AND MOULDINGS PRODUCED THEREFROM, STABILIZER COMPOSITIONS AND USES THEREOF

(71) Applicant: FRAUNHOFER-GESELLSCHAFT ZUR FÖRDERUNG DER ANGEWANDTEN FORSCHUNG E. V., Munich (DE)

(72) Inventors: Elke Metzsch-Zilligen, Darmstadt (DE); Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 339 days.

(21) Appl. No.: 17/287,079

(22) PCT Filed: Oct. 17, 2019

(86) PCT No.: PCT/EP2019/078221
§ 371 (c)(1),
(2) Date: Apr. 20, 2021

(87) PCT Pub. No.: WO2020/083740
PCT Pub. Date: Apr. 30, 2020

(65) Prior Publication Data
US 2021/0388176 A1    Dec. 16, 2021

(30) Foreign Application Priority Data
Oct. 23, 2018   (DE) ..................... 10 2018 218 120.9

(51) Int. Cl.
C08K 5/00 (2006.01)
C08K 5/053 (2006.01)
C08K 5/13 (2006.01)
C08K 5/1545 (2006.01)

(52) U.S. Cl.
CPC ............. *C08K 5/005* (2013.01); *C08K 5/053* (2013.01); *C08K 5/13* (2013.01); *C08K 5/1545* (2013.01)

(58) Field of Classification Search
CPC ......... C08K 5/13; C08K 5/053; C08K 5/1545
See application file for complete search history.

(56) References Cited

U.S. PATENT DOCUMENTS

| | | | |
|---|---|---|---|
| 10,138,354 B2 | 11/2018 | Groos et al. | |
| 10,214,631 B2 | 2/2019 | Pfaendner et al. | |
| 10,323,136 B2 | 6/2019 | Pfaendner et al. | |
| 10,364,340 B2 | 7/2019 | Pfaendner et al. | |
| 10,370,537 B2 | 8/2019 | Pfaendner et al. | |
| 10,450,442 B2 | 10/2019 | Pfaendner et al. | |
| 10,544,284 B2 | 1/2020 | Pfaendner et al. | |
| 10,781,296 B2 | 9/2020 | Groos et al. | |
| 10,913,743 B2 | 2/2021 | Pfaendner et al. | |
| 2012/0091399 A1 | 4/2012 | Guntermann et al. | |
| 2013/0041086 A1 | 2/2013 | Kimura et al. | |
| 2014/0039066 A1 | 2/2014 | Grimadell et al. | |
| 2016/0052927 A1 | 2/2016 | Pfaendner et al. | |
| 2016/0068665 A1 | 3/2016 | Budhavaram et al. | |
| 2016/0272789 A1 | 9/2016 | Pfaendner et al. | |
| 2017/0107375 A1 | 4/2017 | Pfaendner et al. | |
| 2017/0121499 A1 | 5/2017 | Pfaendner et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Pfaendner et al. | |
| 2017/0267835 A1 | 9/2017 | Groos et al. | |
| 2018/0186970 A1 | 7/2018 | Groos et al. | |
| 2019/0248927 A1 | 8/2019 | Klein et al. | |
| 2020/0231783 A1 | 7/2020 | Pfaendner et al. | |
| 2020/0317886 A1 | 10/2020 | Pfaendner et al. | |

(Continued)

FOREIGN PATENT DOCUMENTS

| | | |
|---|---|---|
| CN | 102378785 A | 3/2012 |
| CN | 104448464 B | 10/2015 |
| DE | 102009014856 A1 | 10/2010 |

(Continued)

OTHER PUBLICATIONS

Encyclopedia of Human Nutrition (Third Edition). (Year: 2013).*
U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.

(Continued)

*Primary Examiner* — Wenwen Cai
(74) *Attorney, Agent, or Firm* — Leydig, Voit & Mayer, Ltd.

(57) ABSTRACT

The present invention relates to a method of stabilizing virgin thermoplastic material against oxidative, thermal and/or actinic degradation. In the method of the invention, at least one polyphenol and at least one alditol and/or cyclitol are introduced into a virgin thermoplastic material. The method of the invention can stabilize virgin thermoplastic material with high efficacy and in a very environmentally friendly and inexpensive manner against oxidative, thermal and/or actinic degradation. The present invention additionally also relates to correspondingly stabilized virgin thermoplastic material and to moulding compounds and mouldings produced therefrom. The present invention also further relates to stabilizer compositions and to the use thereof for stabilization of virgin thermoplastic material against oxidative, thermal and/or actinic degradation.

11 Claims, No Drawings

(56) References Cited

U.S. PATENT DOCUMENTS

2020/0361879 A1    11/2020   Fischer et al.
2021/0130582 A1    5/2021   Ciesielski et al.

FOREIGN PATENT DOCUMENTS

| | | |
|---|---|---|
| DE | 102017217312 A1 | 3/2019 |
| JP | 2002-060638 A | 2/2002 |
| JP | 2012-522079 A | 9/2012 |
| JP | 2015-523403 A | 8/2015 |
| WO | WO 2011/024399 A1 | 3/2011 |
| WO | WO 2019/063550 A1 | 4/2019 |

OTHER PUBLICATIONS

U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/423,800, filed Jul. 16, 2021.
U.S. Appl. No. 17/425,267, filed Jul. 22, 2021.
U.S. Appl. No. 17/441,626, filed Sep. 21, 2021.
Al-Malaika, "Learning from mother nature: exploiting a biological antioxidant for the melt stabilisation of polymers," *Macromol. Symp.* 176(1): 107-117 (2001).
Xiang, "Steel Mesh Skeleton Composite Pipe," Chemical Abstracts Service Database accession No. 2015:527627 (May 30, 2015).
Iida et al., "Stabilization of poly(vinyl chloride). V. Synergism between metal soaps and polyols upon stabilization of poly(vinyl chloride)," *J. Appl. Polym. Sci.* 25(5): 887-900 (1980).
Krönke et al., "Antioxidants," *Ullmann's Encyclopedia of Industrial Chemistry*, Viley/VCH, Weinheim (2015) 36 pgs.
Richaud et al., "Polyethylene stabilization against thermal oxidation by a trimethylquinoleine oligomer," *Polymer Degradation and Stability* 94(3): 410-420 (2009).
Steenwijk et al., "The effect of (natural) polyols on the initial colour of heavy metal/ and zinc/free poly(vinyl chloride)," *Polymer Degradation and Stability* 91(9): 2233-2240 (2006).
Wirth et al., "The stabilization of PVC against heat and light," *Pure and Applied Chemistry* 49(5): 627-648 (1977).
German Patent Office, Office Action in German Patent Application No. 10 2018 218 120.9 (Dec. 11, 2018).
German Patent Office, Office Action in German Patent Application No. 10 2018 218 120.9 (Mar. 23, 2021).
European Patent Office, International Search Report in International Application No. PCT/EP2019/078221 (Feb. 3, 2020).
European Patent Office, Written Opinion in International Application No. PCT/EP2019/078221 (Feb. 3, 2020).
International Bureau of WIPO, International Preliminary Report on Patentability—Chapter I in International Application No. PCT/EP2019/078221 (Apr. 27, 2021).
U.S. Appl. No. 17/625,387, filed Jan. 7, 2022.
"Antioxidants", edited by Xingjun Hu, National Defense Industry Press, first edition, p. 162, Oct. 2009.
China National Intellectual Property Administration, Decision on Rejection in Chinese Patent Application No. 201980069843.8 (Jul. 6, 2023).
Japan Patent Office, Notification of Reasons for Refusal in Japanese Patent Application No. 2021-522045 (Jul. 18, 2023).
Japan Patent Office, Notification of Reasons for Refusal in Japanese Patent Application No. 2021-522045 (Mar. 12, 2024).

\* cited by examiner

METHOD OF STABILIZING VIRGIN THERMOPLASTIC MATERIAL AND STABILIZED PLASTICS COMPOSITIONS, MOULDING COMPOUNDS AND MOULDINGS PRODUCED THEREFROM, STABILIZER COMPOSITIONS AND USES THEREOF

CROSS-REFERENCE TO RELATED APPLICATIONS

This patent application is the U.S. national phase of International Application No. PCT/EP2019/078221, filed on Oct. 17, 2019, which claims the benefit of German Patent Application No. 10 2018 218 120.9, filed Oct. 23, 2018, the disclosures of which are incorporated herein by reference in their entireties for all purposes.

The present invention relates to a method for stabilizing virgin thermoplastic material against oxidative, thermal and/or actinic degradation. In the method according to the invention, at least one polyphenol and at least one alditol and/or cyclitol are introduced into a virgin thermoplastic material. By means of the method according to the invention, virgin thermoplastic material may be stabilized with high efficacy and in a very environmentally friendly and economical way against oxidative, thermal and/or actinic degradation. In addition, the present invention also relates to correspondingly stabilized virgin thermoplastic material and also to molding compounds and moldings produced therefrom. The present invention further relates also to stabilizer compositions and also their use for stabilizing virgin thermoplastic material against oxidative, thermal and/or actinic degradation.

Organic materials, such as plastics, are subject to aging processes which ultimately lead to a loss of the desired properties, such as the mechanical properties. This process, referred to as autoxidation, starting from radical chain cleavage by mechanochemical processes or by UV radiation in the presence of oxygen, leads to changes in the polymer chain, for example with regard to the molecular weight or the formation of new chemical groups. Stabilizers are therefore used in order to prevent or at least delay this aging. Important representatives of stabilizers are antioxidants, which interfere with the radicals formed during the autoxidation and thus interrupt the degradation process. A distinction is made generally between primary antioxidants, which are able to react directly with oxygen-containing free radicals or C radicals, and secondary antioxidants, which react with hydroperoxides formed as intermediates (see C. Krohnke et al. Antioxidants in Ullmann's Encyclopedia of Industrial Chemistry, published by Wiley-VCH, Weinheim 2015). Typical representatives of primary antioxidants are, for example, phenolic antioxidants, amines, and also lactones. Classes of secondary antioxidants are phosphorus compounds, such as phosphites and phosphonites, but also organosulfur compounds, such as sulfides and disulfides. Primary and secondary antioxidants are usually frequently combined in practice, which leads to a synergistic effect. Plastics formed from fossil raw materials such as petroleum or natural gas are increasingly being supplemented or replaced by plastics based on renewable raw materials accessible via biochemical processes. The primary and secondary antioxidants used for this purpose (and for plastics formed from fossil raw materials), however, are not yet fully based on renewable raw materials.

Primary antioxidants formed from renewable raw materials which are also used occasionally in plastics are known in principle. A typical example is constituted by tocopherols (vitamin E). Tocopherols, similarly to conventional antioxidants, have a sterically hindered phenol structure and may be used alone or in combination with secondary antioxidants (for example S. Al-Malaika, Macromol. Symp. 2001, 176, 107). Tocopherols may be isolated for example from natural materials, such as wheatgerm oil, sunflower oil or olive oil. Secondary antioxidants, i.e. phosphite or phosphonite structures, however, do not occur in nature, and therefore synergistic combinations of primary and secondary antioxidants formed from renewable raw materials were previously rarely accessible.

This object is achieved by the method for stabilizing virgin thermoplastic materials described herein, by the plastics composition described herein, by the molding compound or a molding which is producible from the plastics composition described herein, by the stabilizer composition described herein and the advantageous developments thereof. Uses of the stabilizer compositions according to the invention are also described.

This object is achieved by the method for stabilizing virgin thermoplastic materials described herein, by the plastics composition described herein, by the molding compound or a molding which is producible from the plastics composition described herein, by the stabilizer composition described herein and the advantageous developments thereof. Uses of the stabilizer compositions according to the invention are also described.

In accordance with the invention a method for stabilizing virgin thermoplastic material against oxidative, thermal and/or actinic degradation is thus described, in which at least one polyphenol (also referred to hereinafter as "component (A)") as well as at least one alditol and/or cyclitol (also referred to hereinafter as "component (B)") are introduced into a virgin thermoplastic material.

The plastics to be stabilized may be produced here on the basis of fossil raw materials or from renewable raw materials.

Virgin thermoplastic material means as yet unused plastics material, i.e. plastics material that has not yet passed through a cycle of use. Corresponding virgin plastics material is also referred to as "virgin resin" or "pristine resin". Virgin plastics material may also be referred to as "new plastic" or as "virgin plastic". In the sense of the present invention, the virgin plastics material may be present for example in the form of fresh plastic granules or plastic powder, or also in the form of plastic melts that occur during the production process. Virgin plastics material thus differs from recycled plastic.

Virgin plastics material, in contrast to recycled plastic, usually has no previous damage, or no significant previous damage, i.e. there are no new chemical groups present on the polymer chain that have been generated by oxidative or (photo)oxidative processes, or such groups are only present to a very small extent. Recycled polyolefin materials, for example, are primarily carbonyl groups, which are not present in virgin materials or are only present to a very small extent. The same is true for the concentration of acid groups, which are not present in virgin materials or are only present to a very small extent, whereas recycled materials have a significant concentration. The concentration of the carbonyl groups is therefore, at the same time, a measure for the previous damage of the polymers. The concentration of carbonyl groups may be determined in accordance with known analytical methods, for example infrared spectroscopy, as is described for example in E. Richaud et al. Pol. Degr. Stab. 2009, 94,410-420. In this case, the absorption of the carbonyl vibration in the region of 1720 cm$^{-1}$ is measured. In the case of virgin material, the concentration of carbonyl groups is generally below 5 mmol/kg, and the concentration of acid groups below 2 mmol/kg.

It has surprisingly bee found that the combination of polyphenols and sugar alcohols (alditols/cyclitols) shows a very good stabilizing effect in virgin thermoplastic material. In the method according to the invention the at least one polyphenol (component (A)) and the at least one alditol and/or cyclitol (component (B)) are introduced into a virgin thermoplastic material. The components (A) and (B) may be introduced here individually or separately from one another into the virgin plastics material, or the components (A) and (B) may be introduced together in the form of a composition containing the components (A) and (B) or in the form of a composition consisting of the components (A) and (B) into the virgin plastics material.

In a further preferred embodiment, the components (A) and (B) consist of a renewable raw material.

The components (A) and (B), which may be present in the form of powder, compacted, granules, liquid, syrup, solution or flakes, are preferably mixed with the virgin polymer material to be stabilized, and the polymer matrix is transferred into the melt and is the cooled. Alternatively, it is also possible to introduce an additive that is solid at room temperature in a molten state into a polymer melt.

Furthermore, the components (A) and (B) may be produced and introduced in the form of what are known as master batches or concentrates, which for example contain 10-90% of a stabilizer composition consisting of the components (A) and (B) in a polymer or oligomers, such as a polyethylene wax, polypropylene wax, or a natural plant wax.

The components (A) and (B) may be introduced into the virgin thermoplastic material by mixing the components (A) and (B) with the virgin thermoplastic material present as a solid, and the resultant mixture is melted and then cooled.

The component (A) and component (B) used in accordance with the invention act together as a synergistic stabilizer for the virgin thermoplastic material, wherein the oxidative, verbal and/or actinic degradation of the virgin thermoplastic material is inhibited or prevented. In other words, the plastic is stabilized against oxidative, thermal and/or actinic degradation due to the introduction of the component (A) and additionally the component (B) into the virgin thermoplastic material.

The present invention is characterized particularly in that a combination of polyphenols and alditols (sugar alcohols) and/or cyclitols is used to stabilize virgin thermoplastic material.

A combination of polyphenols and sugar alcohols or polyols has not previously been used to stabilize virgin thermoplastic material. Sugar alcohols and polyols, in accordance with the prior art, are merely components and formulations for the thermal stabilization of polyvinyl chloride (PVC) and other halogen-containing polymers, such as polyvinylidene chloride (PVC) in compositions that contain metal soaps as thermal stabilizers. This stabilizing effect of polyols in halogen-containing polymers is explained by the fact that a chelating process occurs and the zinc compounds promoting PVC degradation are deactivated (see H. O. Wirth, H. Andreas, Pure Appl. Chem. 1977, 49, 627-648; T. Iida, K. Goto, J. Appl. Pol. Sci. 1980, 25, 887-900) or a reaction as HCl scavenger in Zn-free PVC is achieved (see J. Steenwijk et al. Pol. Degr. Stab. 2006, 2233-2240).

In accordance with the invention, it has surprisingly been found that a very effective stabilization of virgin thermoplastic material against oxidative, thermal and/or actinic degradation may be achieved by the introduction of at least one polyphenol and at least one alditol and/or at least one cyclitol alone and optionally together with at least one further primary and/or at least one secondary antioxidant. In addition, polyphenols and also alditols and cyclitols are very environmentally friendly and economical compounds. Virgin thermoplastic materials may thus be stabilized in a very effective, environmentally friendly and economical manner against oxidative, thermal and/or actinic degradation by means of the method according to the invention.

In accordance with a preferred embodiment, the polyphenols (A) comprise at least one aromatic group with at least two phenol groups or at least two aromatic groups each with a phenol group and are preferably isolated from natural materials, recovered biochemically from natural materials, chemically modified from natural materials, or produced chemically in a nature-identical manner.

Suitable polyphenols (A) are, for example, bile acids, hydroxytyrosol, flavonols such as chrysin, quercitin, hesperidin, neohesperidin, naringin, marine, caempherol, fisetin, anthocyans, such as delphinidin and malvidin, carnosic acid, carnosol, rosmarinic acid and resveratrol, tannins, silymarin, silybin contained therein, isosylibin, silydianin, ellagic acid. The polyphenols are preferably isolated from natural materials and are therefore renewable raw materials; a chemical-synthetic reaction may possibly occur after the isolation and purification. Examples of these are esters of bile acid, for example hexyl, heptyl, octyl, nonyl, decyl, isodecyl, lauryl, stearyl, myristyl, cetyl or oleyl gallate. Natural materials furthermore are frequently mixtures of different active substances and mixtures of optical isomers.

Preferred polyphenols are the following structures:

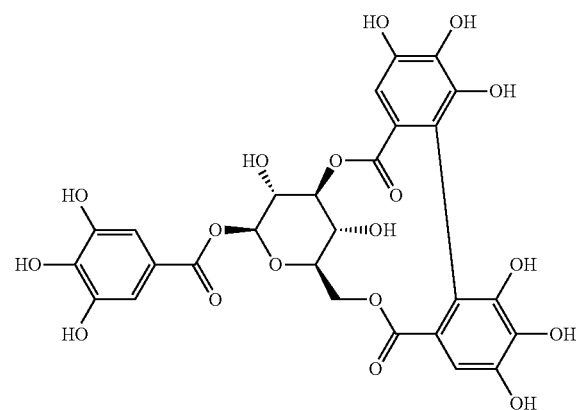

tannin, such as gallotannin (corilagin)

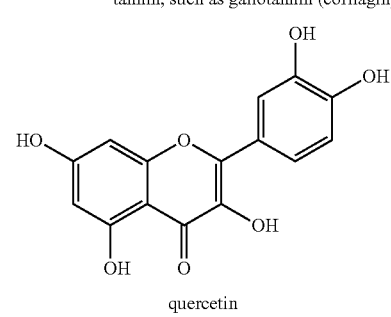

quercetin

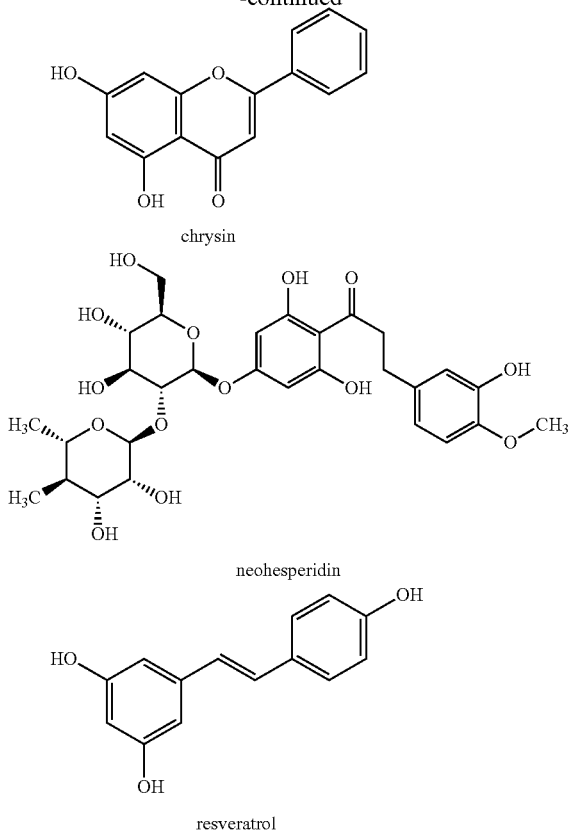

Tannin or quercetin are particularly preferred.

In accordance with a further preferred variant of the method according to the invention, the at least one alditol has the empirical formula

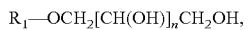

or

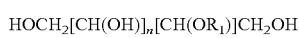

with n=2-6, preferably n=3-5, wherein $R_1$ is an optionally substituted sugar residue.

The at least one alditol is preferably selected from the group consisting of threitol, erythritol, galactitol, mannitol, ribitol, sorbitol, xylitol, arabitol, isomalt, lactitol, maltitol, altritol, iditol, maltotritol and hydrogenated oligo- and polysaccharides with polyol end groups and mixtures hereof. The at least one preferred alditol is particularly preferably selected from the group consisting of erythritol, mannitol, isomalt, maltitol and mixtures hereof. The at least one alditol is very particularly preferably mannitol or erythritol. Maltitol may furthermore be present in the form of what is known as syrup, which is obtained technically by hydrogenation of glucose and contains, in addition to maltitol and sorbitol, also hydrogenated oligo- and polysaccharides with alditol end groups. The alditols may be present here in different optical isomers, for example in the D form or L form or meso form.

Examples of heptitols and octitols are: meso-glycero-allo-heptitol, D-glycero-D-altro-heptitol, D-glycero-D-manno-heptitol, meso-glycero-gulo-heptitol, D-glycero-D-galacto-heptitol (perseitol), D-glycero-D-gluco-heptitol, L-glycero-D-gluco heptitol, D-erythro-L-galacto-octitol, D-threo-L-galacto-octitol.

Preferred alditols and substituted alditols have a melting point of >100° C., have a low water solubility, and a low water uptake (hygroscopy). Further preferred compounds melt under the usual processing conditions of polyolefins in the range of from 150 to -250° C. and have a decomposition temperature>250° C.

The structures and freezing points of preferred alditols can be inferred from the following Table 1.

TABLE 1

| Name | Chemical structure | Freezing point [° C.] |
|---|---|---|
| Arabitol | | 103 |
| Erythritol | | 120-123 |
| Isomalt (Palatinit) | | 145-150 (mixture) |

TABLE 1-continued

| Name | Chemical structure | Freezing point [° C.] |
| --- | --- | --- |
| Galactitol (galactinol) | | 185-188 |
| Lactitol | | 146 |
| Maltitol | | 149-152 |
| Mannite (Mannitol) | | 166-168 |
| Ribitol | | 102 |
| Sorbitol | | 94-96 |
| Maltotritol | | 184 |

TABLE 1-continued

| Name | Chemical structure | Freezing point [° C.] |
|---|---|---|
| Hydrogenated oligo- and polysaccharides | 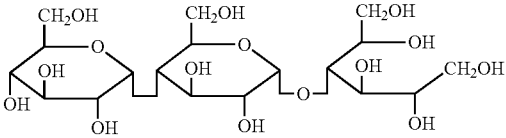 | |

Alternatively or additionally to the aforementioned alditols, in the method according to the invention (or for the purposes of the plastics composition, the molding compound or the molding, or the stabilizer composition according to the invention) cyclitols, i.e. ring-like polyols, may also be used.

In particular, the at least one cyclitol may be selected from the group consisting of inositol (myo, scyllo-, D-chiro-, L-chiro-, muco-, neo-, allo-, epi- and cis-inositol), 1,2,3,4-tetra hydroxycyclohexane, 1,2,3,4,5-pentahydroxycyclohexane, quercitol, viscumitol, bornesitol, conduritol, ononitol, pinitol, pinpollitol, quebrachitol, ciceritol, quinic acid, shikimic acid and valienol; in this case myo-inositol is preferred.

For the purposes of the present invention, the alditols and/or cyclitols contained as components (B) are comprehended collectively in respect of their proportion by weight to be component (B), and this is therefore always understood to mean the totality of the contained alditols and/or cyclitols.

A further preferred embodiment provides that component (A) and component (B) are introduced into the virgin thermoplastic material in a weight ratio of from 5:95 to 90:10, preferably from 10:90 to 90:10, particularly preferably from 20:80 to 80:20.

Furthermore, in the method according to the invention preferably
(A) 0.02 to 3.0 parts by weight, preferably 0.06 to 1.0 parts by weight of at least one polyphenol,
(B) 0.02 to 3.0 parts by weight, preferably 0.03 to 0.5 parts by weight of at least one alditol and/or at least one cyclitol are introduced into
(C) 94.0 to 99.96 parts by weight, preferably 98.5 to 99.91 parts by weight of a virgin thermoplastic material or mixtures hereof
so that (A), (B) and (C) give 100%.

For the purposes of the present invention it is preferred in particular if the virgin thermoplastic material is selected from the group consisting of
a) polymers from olefins or diolefins, such as polyethylene, in particular LDPE, LLDPE, VLDPE, ULDPE, MDPE, HDPE and UHMWPE, metallocene-PE (m-PE), polypropylene, poylisobutylene, poly-4-methyl-pentene-1, polybutadiene, polyisoprene, polycyclooctene, polyalkylene-carbon monoxide copolymers, and corresponding copolymers in the form of random or block structures, for example polypropylene-polyethylene (EP), EPM or EPDM, ethylene-vinyl acetate (EVA), ethylene-acrylic ester, such as ethylene-butylacrylate, ethylene-acrylic acid-glycidyl acrylate, and corresponding graft polymers such as polypropylene-g-maleic acid anhydride, polypropylene-g-acrylic acid and polyethylene-g-acrylic acid, polyethylene-polybutylacrylate-g-maleic acid anhydride, long-chain-branched polypropylene copolymers, which are produced with alpha-olefins as comonomers, in particular 1-butene, 1-hexene, 1-octene and/or 1-octadecene and blends of a plurality of the aforementioned polymers, such as LLPE/LLDPE,
b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene isoprene, styrene-isoprene-styrene (SIS), styrene-butadiene-acrylonitrile (ABS), styrene-acrylonitrile-acrylate (ASA), styrene-ethylene, styrene-maleic acid anhydride polymers including corresponding graft copolymers, such as styrene on butadiene, maleic acid anhydride on SBS or SEBS, and graft copolymers from methyl methacrylate, styrene-butadiene and ABS (MABS) and also hydrogenated polystyrene derivatives such as polyvinylcyclohexane,
c) halogen-containing polymers, such as polyvinyl chloride (PVC), polychloroprene, polyvinylidene chloride (PVDC), copolymers of vinyl chloride and vinylidene chloride, copolymers of vinyl chloride and vinyl acetate, chlorinated polyethylene, polyvinylidene fluoride, epichlorohydrin homo- and copolymers, in particular with ethylene oxide (ECO),
d) Polymers of unsaturated esters such as polyacrylates and polymethacrylates such as polymethyl methacrylate (PMMA), polybutyl acrylate, polylauryl acrylate, polystearyl acrylate, polyacrylonitrile, polyacrylamide, and corresponding copolymers such as polyacrylonitrile-polyalkylacrylate,
e) polymers from unsaturated alcohols and derivatives, such as polyvinyl alcohol, polyvinyl acetate, polyvinyl butyral, polyallyl phthalate, polylallyl melamine,
f) polyacetals such as polyoxymethylene (POM), and corresponding copolymers, such as copolymers with butanal,
g) polyphenylene oxides and blends of these with polystyrene or polyamides,
h) polymers of cyclic ethers such as polyethylene glycol, polypropylene glycol, polyethylene oxide, polypropylene oxide, polytetrahydrofuran,
i) polyurethanes from hydroxy-terminated polyethers or polyesters and aromatic or aliphatic isocyanates, such as 2,4- or 2,6-toluene diisocyanate or methylene diphenyldiisocyanate, linear polyurethanes (TPU) or polyureas,
j) polyamides such as polyamide 6, 6.6, 6.10, 4.6, 4.10, 6.12, 10.10, 10.12, 12.12, polyamide 11, polyamide 12 and (partly) aromatic polyamides such as polyphthalamide, for example produced from terephthalic acid and/or isophthalic acid and aliphatic diamines, such as hexamethylene diamine or m-xylylene diamine or from aliphatic dicarboxylic acids, such as adipic acid or sebacic acid and aromatic diamines, such as 1,4- or 1,3-diaminobenzene, blends of different polyamides, such as PA-6 and PA 6.6 or blends of polyamides and polyolefins, such as PA/PP, k) polyimides, polyamide-imides, polyether imides, polyester imides, poly(ether)ketones, polysulfones, polyether sulfones, polyaryl sulfones, polyphenylene sulfide, polybenzimidazoles, polyhydantoins, l) polyesters of aliphatic or aromatic dicarboxylic acids and diols or from hydroxy-carboxylic acids, such as polyethylene terephthalate (PET), polybutylene terephthalate (PBT), polypropylene terephthalate (PTT), polyethylene naphthylate (PEN), poly-1,4-dimethylolcyclohexane terephthalate, polyhydroxybenzoate, polyhydroxynaphthalate, polylactic acid (PLA), polyhydroxybutyrate (PBT), polyhydroxyvalerate (PHV), polyethylene succinate, polybutylene succinate (PBS) and polycaprolactone, m) polycarbonates (PC), polyester carbonates, and blends thereof, such as PC./ABS, PC./PBT, PC./PET/PBT, PC./PA n) cellulose derivatives, such as cellulose nitrate, cellulose acetate, cellulose propionate, cellulose butyrate, o) epoxy resins consisting of di- or polyfunctional epoxy compounds in combination with, for example, curing agents based on amines, anhydrides, dicyandiamide, mercaptans, isocyanates or catalytically acting curing agents, p) phenol resins, such as phenol-formaldehyde resins, urea-formaldehyde resins or melamine-formaldehyde resins, q) unsaturated polyester resins of unsaturated dicarboxylic acids and diols with vinyl compounds, such as styrene, alkyd resins, r) silicones, such as those based on dimethylsiloxanes, methyl-phenyl-siloxanes or diphenylsiloxanes, wherein the aforementioned silicones may also be wholly or partially end-group-terminated, for example vinyl-group-terminated, s) polymers based on natural substances, such as starch, alginates, chitin or chitosan, t) and mixtures, combinations or blends of two or more of the aforementioned polymers.

All of the aforementioned polymers are used here in the form of virgin material.

The virgin thermoplastic material is particularly preferably selected from the group consisting of polymers from olefins or diolefins, such as polyethylene, in particular LDPE, LLDPE, VLDPE, ULDPE, MDPE, HDPE and UHMWPE, metallocene-PE (m-PE), polypropylene, poylisobutylene, poly-4-methyl-pentene-1, polybutadiene, polyisoprene, polycyclooctene, polyalkylene-carbon monoxide copolymers, and corresponding copolymers in the form of random or block structures, for example polypropylene-polyethylene (EP), EPM or EPDM, ethylene-vinyl acetate (EVA), ethylene-acrylic ester, such as ethylene-butylacrylate, ethylene-acrylic acid-glycidyl acrylate, and corresponding graft polymers such as polypropylene-g-maleic acid anhydride, polypropylene-g-acrylic acid and polyethylene-g-acrylic acid.

The virgin thermoplastic material is very particularly preferably polyolefin. For example, the virgin thermoplastic material may be polypropylene, that is to say in particular a polypropylene, or polyethylene, that is to say in particular a polyethylene.

Polymers of renewable raw materials, in particular polyesters such as polylactic acid (PLA), polyhydroxy butyrate (PBT), polyhydroxy valerate (PHV), polyethylene succinate, polybutylene succinate (PBS) and polyamides of renewable raw materials such as polyamide 10.10 or polyamide 11 are furthermore particularly preferred.

In a further preferred embodiment the polymers are halogen-free.

Furthermore, it is also possible that additional stabilizer, for example a further primary antioxidant, is incorporated into the virgin thermoplastic material. For the purposes of the method according to the invention, however, it is also possible that the use of a phenolic antioxidant is omitted. For the case that a primary antioxidant is used to stabilize the virgin thermoplastic material, this primary antioxidant is preferably selected from the group consisting of phenolic antioxidants, amines, lactones and mixtures hereof.

For example, the following may be used as further phenolic antioxidants:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols, such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures hereof;

alkylthiomethyl phenols, such as 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

hydroquinones and alkylated hydroquinones, such as 2,6-di-tert-butyl-4-methyoxyphenol, 2,5-di-tert-butylhydroquinone, 2,5-di-tert-a mylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxylphenyl)adi pate;

tocopherols, such as α-, β-, γ-, δ-tocopherol and mixtures hereof (vitamin E);

hydroxylated thiodiphenyl ethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;

alkylidene bisphenols, such as 2,2'methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butyl phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol]], 4,4'-methylenebis(2,6-di-tert-butylphenol, 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methyl benzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;

O-, N- and S-benzyl compounds, such as 3,5,3',5'-tetra-tert-butyl-4,4'-dihydroxydibenzylether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate;

hydroxybenzylated malonates, such as dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)ma lonate;

aromatic hydroxybenzyl compounds, such as 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol;

triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate;

benzyl phosphonates, such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;

acylaminophenols, such as 4-hydroxylauranilide, 4-hydroxystearanilide, octyl-N-(3,5-di-tert-butyl-4-hydroxyphenyl)carba mate;

esters of β-(3,5-di-tert-butyl-4-hydroxyphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(5-tert-butyl-4-hydroxy-3-methylphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;

esters of β-(3,5-di-tert-butyl-4-hydroxyphenyl)propionic acid with mono- or polyhydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of β-(3,5-di-tert-butyl-4-hydroxyphenyl)acetic acid with mono- or polyhydric alcohols, such as methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as N,N'-bis(3,5-di-tert-butyl-4-hydroxyphenylpropionyl)hexamethylene diamide, N, N'-bis(3,5-di-tert-butyl-4-hydroxyphenylpropionyphexamethylenediamide, N,N'-bis(3,5-di-tert-butyl-4-hydroxyphenylpropionyphexamethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, marketed by Addivant);

ascorbic acid (vitamin C).

Particularly preferred phenolic antioxidants are the following structures:

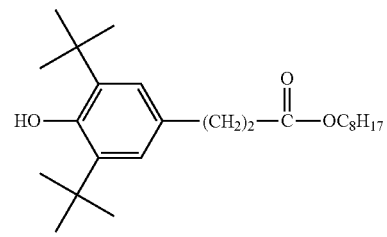

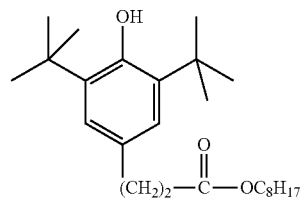

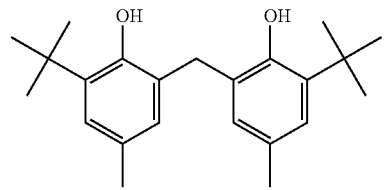

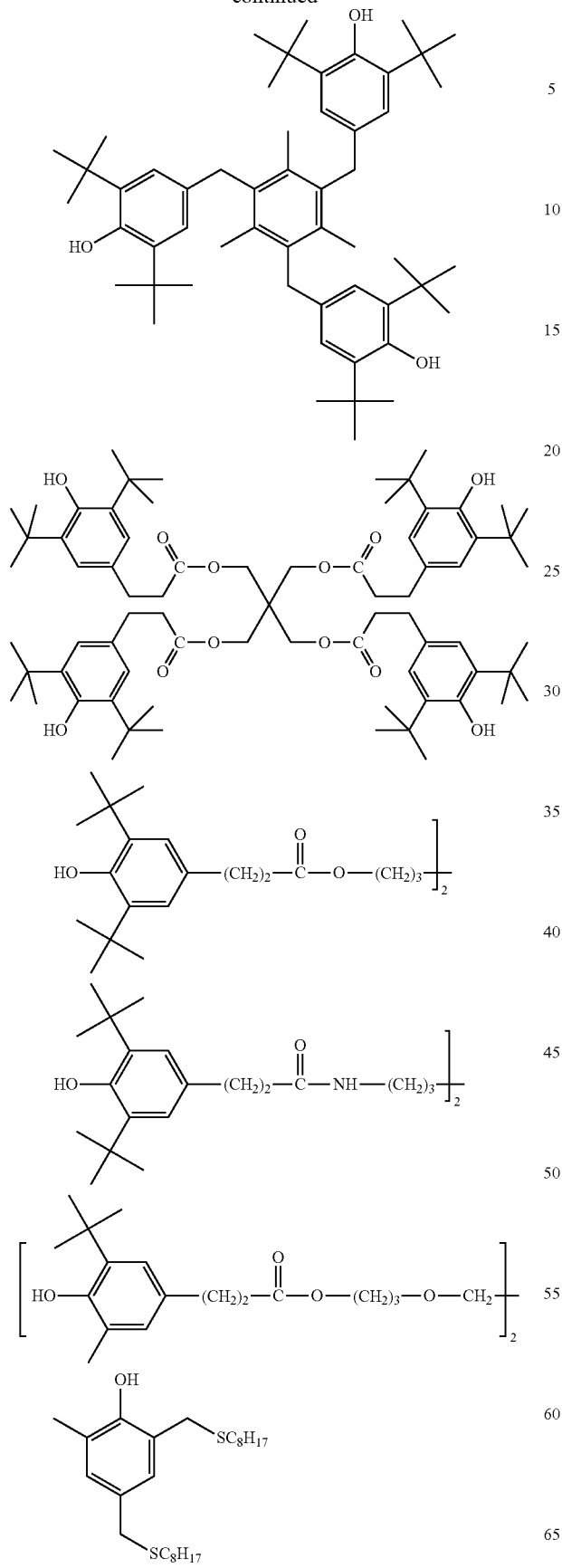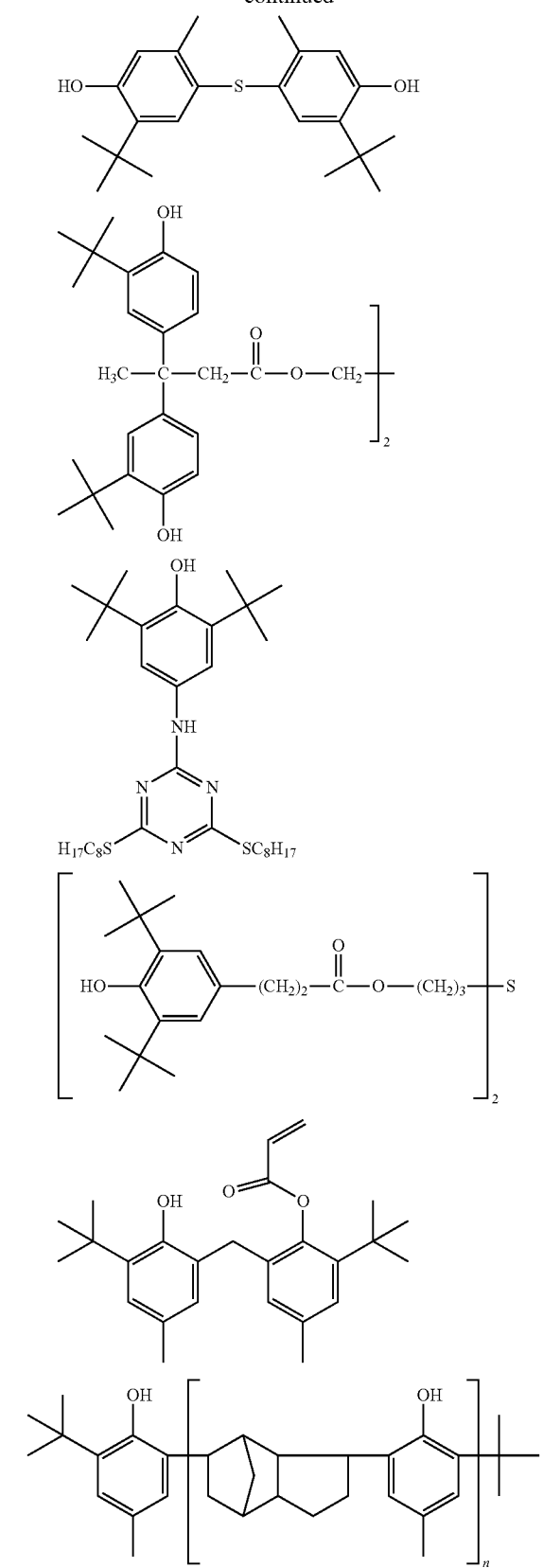

-continued

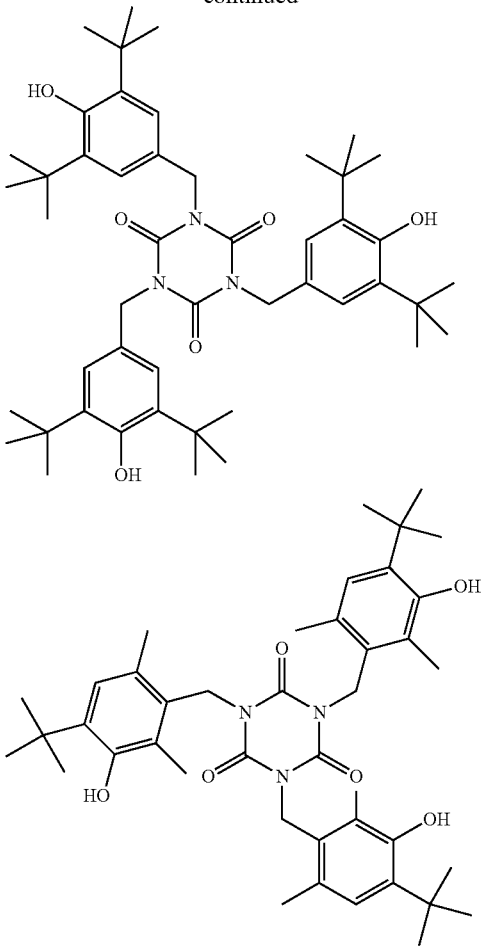

Further preferred phenolic antioxidants are monophenolic antioxidants based on renewable raw materials, such as tocopherols (vitamin E).

Very particularly preferred are the phenolic antioxidants pentaerythritol-tetrakis[3-(3,5-di-tert-butyl-4-hydroxyphenyl)propionate or octadecyl 3-(3,5-di-tert-butyl-4-hydroxyphenyl)propionate as primary antioxidant.

For example, the following may be used as amine antioxidants:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluene sulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethyl-aminomethyl-phenol, 2,4'-diaminodiphenylmethane, 4,4'-diaminodiphenylmethane, N,N,N',N'-tetra-methyl-4,4'-diaminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazinene, N-allylphenothiazine, N,N,N',N'-tetraphenyl-1,4-diaminobut-2-ene and mixtures or combinations hereof.

Preferred amine antioxidants are:
N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine.

Further preferred amine antioxidants are:
hydroxylamines or N-oxides (nitrones), such as N,N-dialkylhydroxylamine, N,N-dibenzylhydroxylamine, N,N-dilaurylhydroxylamine, N,N-distearylhydroxylamine, N-benzyl-α-phenylnitrone, N-octadecyl-α-hexadecylnitrone, and Genox EP (marketed by Addivant) according to the formula:

Preferred lactones are:
benzofuranones and indolinones such as 3-(4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-(2-hydroxyethoxy] phenyl)benzofuran-2-one), 5,7-di-tert-butyl-3-(4-ethoxyphenyl)benzofuran-2-one, 3-(4-acetoxy-3,5-di methylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-di methylphenyl)-5,7-di-tert-butyl-benzofuran-2-one, and lactones which additionally have a phosphite group.

A further preferred variant of the method according to the invention is characterized in that the at least one secondary antioxidant is selected from the group consisting of phosphorus compounds, in particular phosphites and phosphonites, organosulfur compounds, in particular sulfides and disulfides, and mixtures hereof.

For example, the following may be used as phosphites or phosphonites:
triphenylphosphite, diphenylalkylphosphite, phenyldialkylphosphite, tri(nonylphenyl)phosphite, trilaurylphosphite, trioctadecylphosphite, distea rylpentaerythritoldi phosphite, tris-(2,4-di-tert-butylphenyl)phosphite, diisodecylpentaeryth ritoldi phosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl) pentaerythritoldiphosphite, diisodecyloxypentaerythritoldiphosphite, bis(2,4-di-tert-butyl-6-methylphenyl) pentaerythritoldi phosphite, bis(2,4,6-tris(tert-butylphenyl)pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methylphosphite, bis(2,4-di-tert-butyl-6-methylphenyl)ethylphosphite, 6-fluoro-2,4,8,10-tetra-tert-butyl-12-methyl-dibenz[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

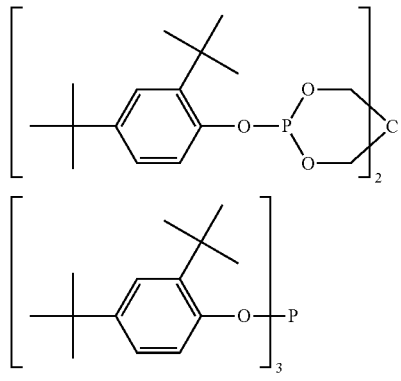

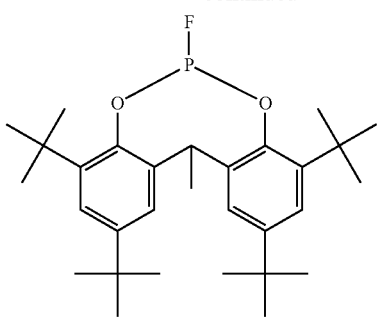

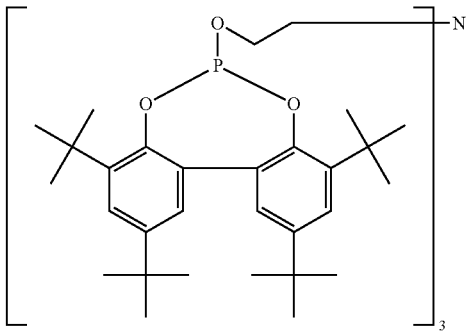

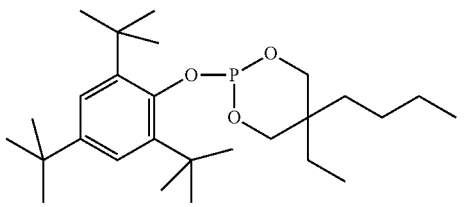

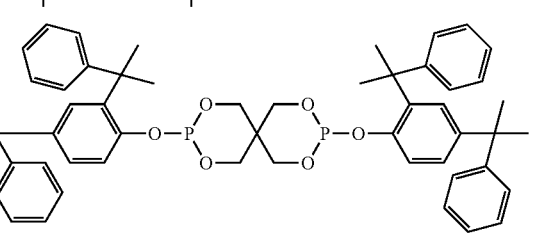

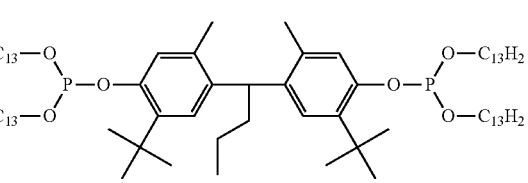

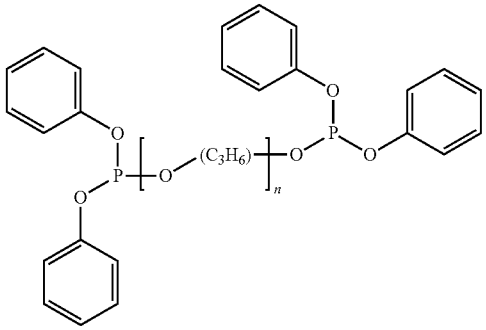

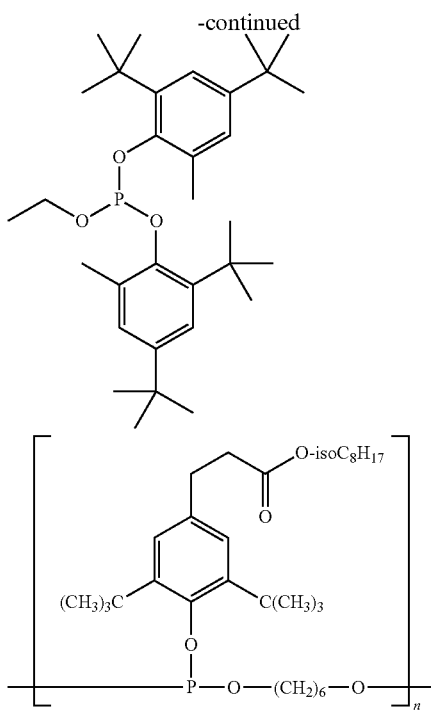

With n=3-100

The phosphite tris-(2,4-di-tert-butylphenyl)phosphite is particularly preferably used as secondary antioxidant.

Preferred sulfur compounds are:

distearyl thiodipropionate, dilauryl thiodipropionate; ditridecyl dithiopropionate, ditetradecyl thiodipropionate, 3-(dodecylthio)-1,1'-[2,2-bis[[3-(dodecylthio)-1-oxopropoxy]methyl]-1,3-propandiyl]propanoic acid ester.

In a further preferred embodiment, a secondary antioxidant may also be used in addition to the at least one further primary antioxidant.

For the case that further constituents are added to the virgin thermoplastic material, these may be added to the polymers separately in the form of liquids, powders, granular materials or compacted products or together with the additive composition according to the invention as previously described.

At least one additive may preferably be introduced additionally into the virgin thermoplastic material, which additive is selected from the group consisting of UV absorbers, light stabilizers, metal deactivators, filler deactivators, antiozonants, nucleation agents, antinucleation agents, impact modifiers, plasticizers, antiplasticizers, lubricants, rheology modifiers, thixotropy agents, chain extenders, optical brighteners, antimicrobial active substances, antistatic agents, thermally and/or electrically conductive additives, slip agents, antiblocking agents, coupling means, crosslinking agents, anticrosslinking agents, hydrophilizing agents, hydrophobing agents, adhesion promoters, dispersants, compatibilizers, oxygen scavengers, acid scavengers, propellants, degradation additives, antifoaming agents, odor scavengers, markers, antifogging agents, fillers, reinforcements, and mixtures hereof.

It is furthermore preferred that at least one additive is additionally introduced into the virgin thermoplastic material and is selected from the group consisting of
a) acid scavengers, preferably calcium stearate, magnesium stearate, zinc stearate, aluminum stearate, calcium lactate, calcium stearoyl-2-lactate, hydrotalcites, in particular synthetic hydrotalcites, based on aluminum, magnesium and zinc, hydrocalumites, zeolites, alkaline earth oxides, in particular calcium oxide and magnesium oxide, alkaline earth carbonates, in particular calcium carbonate, magnesium carbonate and dolomite, and hydroxides, in particular brucite (magnesium hydroxide),
b) light stabilizers, preferably light stabilizers from the group of hindered amines,
c) dispersants,
d) filler deactivators, and mixtures hereof.

Suitable light stabilizers are, for example, compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Suitable 2-(2'-hydroxyphenyl)benzotriazoles are, for example, 2-(2'-hydroxy-5'methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxy-phenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the product of the re-esterification of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, wherein R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl] benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethyoxy derivatives of the 2-hydroxybenzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are, for example, 4-tert-butylphenylsalicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4- hydroxybenzoate, 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixtures with 2-ethoxy-2'-ethyl-5,4'-di-tert-butoxanilide, mixtures of n- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-di methylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyldihydrazide, oxanilide, isophtaloyldihydrazide, sebacoylbisphenylhydrazide, N,N'-diacetyladipoyldihydrazide, N,N'-bis(salicyloyl) oxylyldihydrazide, N,N'-bis(salicyloyl) thiopropionyldihydrazide.

Suitable hindered amines are, for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, 1-cyclohexyloxy-2,2,6,6-tetramethyl-4-octadecylaminopiperidine, bis(1-acyl-2,2,6,6-tetramethyl piperidin-4-yl)sebacate 1-(2-hydroxy-2-methylpropoxy)-4-hydroxy-2,2,6,6-tetramethyl piperidine, 1-(2-hydroxy-2-methylpropoxy)-4-oxo-2,2,6,6-tetramethylpiperidine, bis(1-octyloxy-2,2,6,6-tetra methylpiperidyl) succinate, N, N'-bis-formyl-N,N'-bis(2,2,6,6-tetramethyl-4-piperidyl)hexamethylene diamine, (33a) bis(1-undecanyloxy-2,2,6,6-tetramethylpiperidin-4-yl)carbonate, 1,2,2,6,6-pentamethyl-4-aminopiperidine,2-undecyl-7,7,9,9-tetra methyl-1-oxa-3,8-diaza-4-oxo-spiro[4,5]decane-tris (2,2,6,6-tetramethyl-4-piperidyl)nitrilotriacetate 1,1'-(1,2-ethanediyl)-bis(3,3,5,5-tetramethylpiperazinone), 3-n-octyl-7, 7,9,9-tetramethyl-1,3,8-triazaspiro[4.5]decane-2,4-dione, 8-acetyl-3-dodecyl-7,7,9,9-tetramethyl-1,3,8-triazaspiro [4.5]decane-2,4-dione, 3-dodecyl-1-(2,2,6,6-tetra methyl-4-piperidyl)pyrrolidine-2,5-dione, 3-dodecyl-1-(1,2,2,6,6-pentamethyl-4-piperidyl)pyrrolidine-2,5-dione, bis(1,2,2,6,6-pentamethyl-4-pi peridyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylene diamine and 4-tert-octylamino-2,6-dichloro-1,3,5-triazine, tris(2,2,6,6-tetramethyl-4-piperidyl)nitrilotriacetate, tetrakis (2,2,6,6-tetramethyl-4-piperidyl)-1,2,3,4-butane tetracarboxylate, 1,1'-(1,2-ethanediyl)-bis(3,3,5,5-tetra methylpiperazinone), 4-benzoyl-2,2,6,6-tetramethylpiperidine, 4-stearyloxy-2,2,6,6-tetra-methylpiperidine, linear or cyclic condensation products of N,N'-bis(2,2,6,6-tetramethyl-4-piperidyl)hexamethylene diamine and 4-morpholino-2,6-dichloro-1,3,5-triazine the reaction product of 7,7,9,9-tetramethyl-2-cycloundecyl-1-oxa-3,8-diaza-4-oxospiro-[4,5] decane and epichlorohydrin.

The above-mentioned structures in each instance also include the sterically hindered N—H, N-alkyl such as N-methyl or N-octyl, the N-alkoxy derivatives such as N-methoxy or N-octyloxy, the cycloalkyl derivatives such as N-cyclohexyloxy and -(2-hydroxy-2-methylpropoxy) analogues.

Preferred hindered amines also have the following structures:

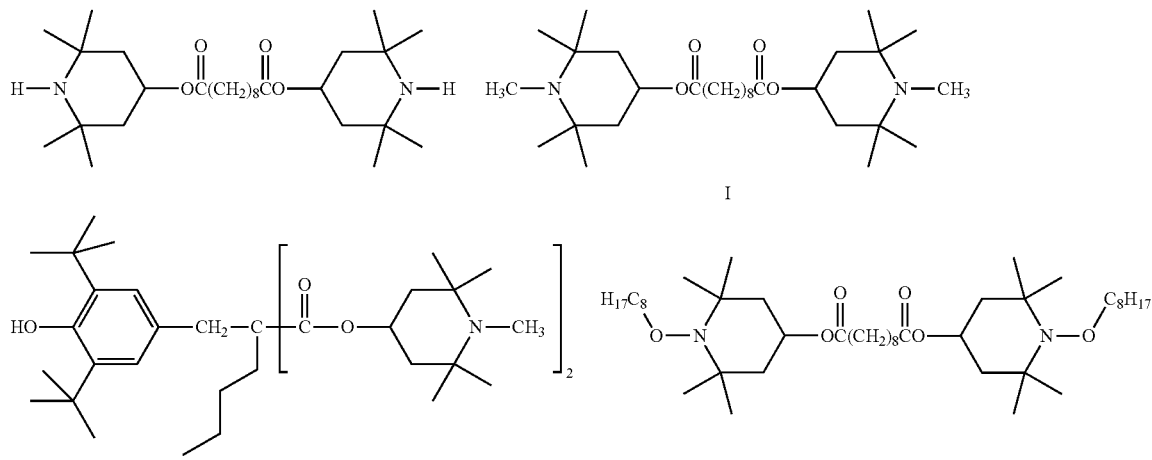

I

-continued
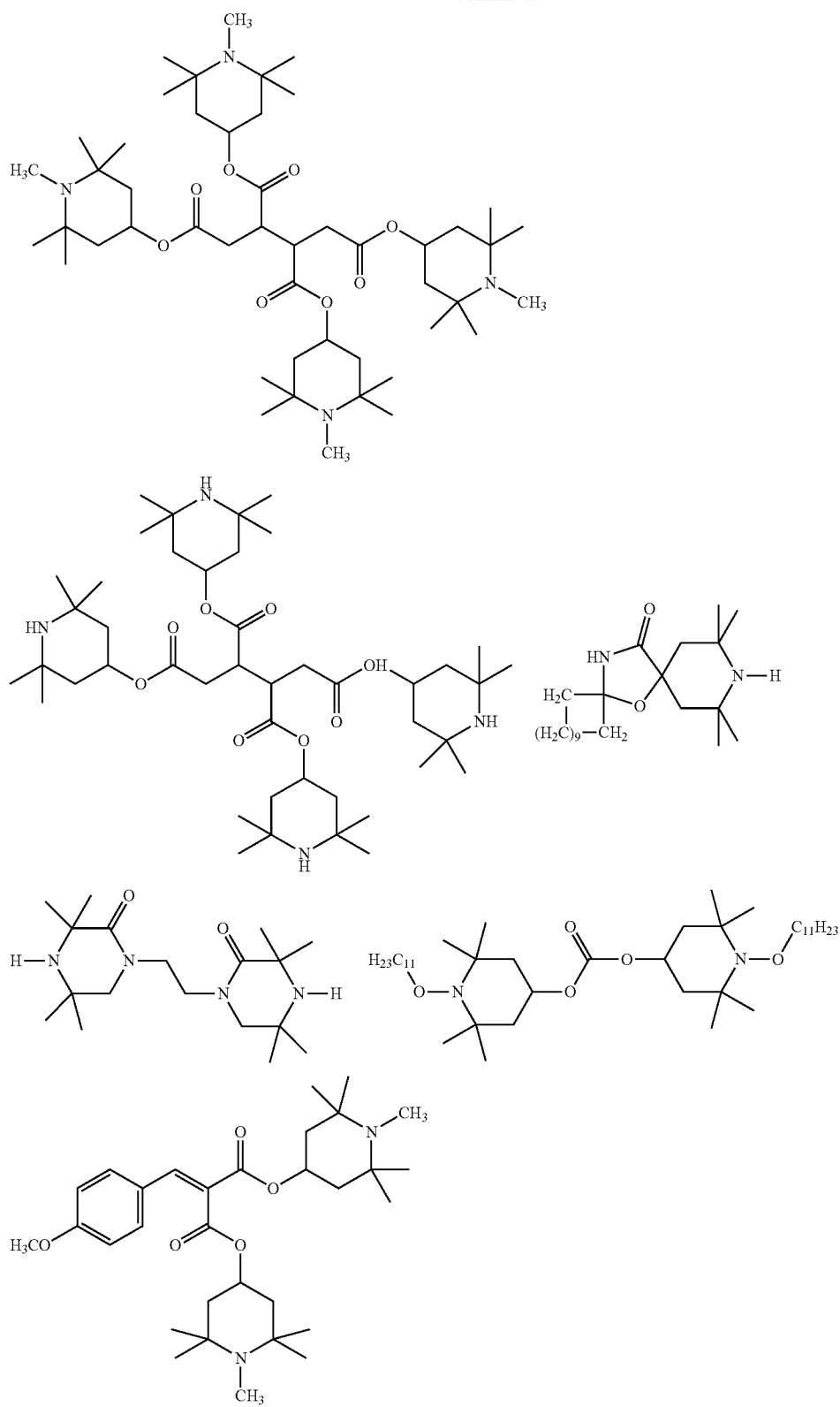

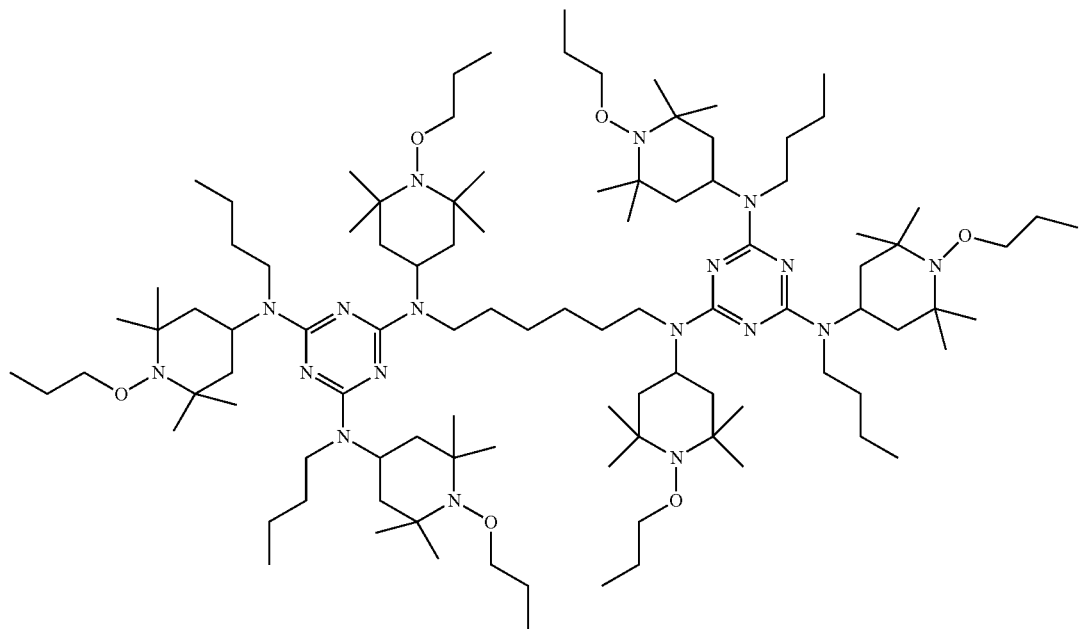
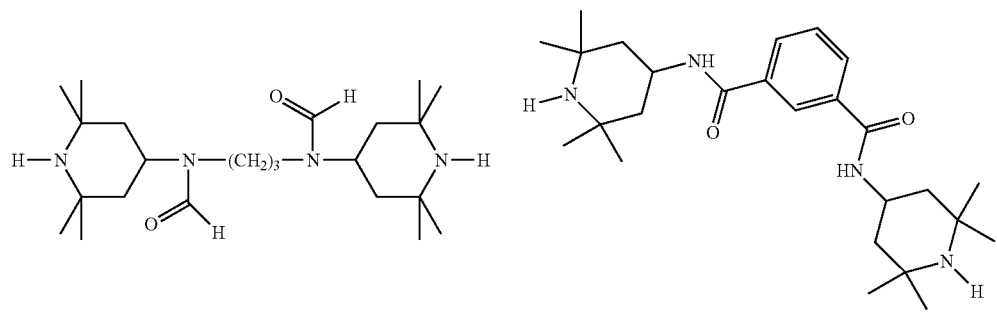
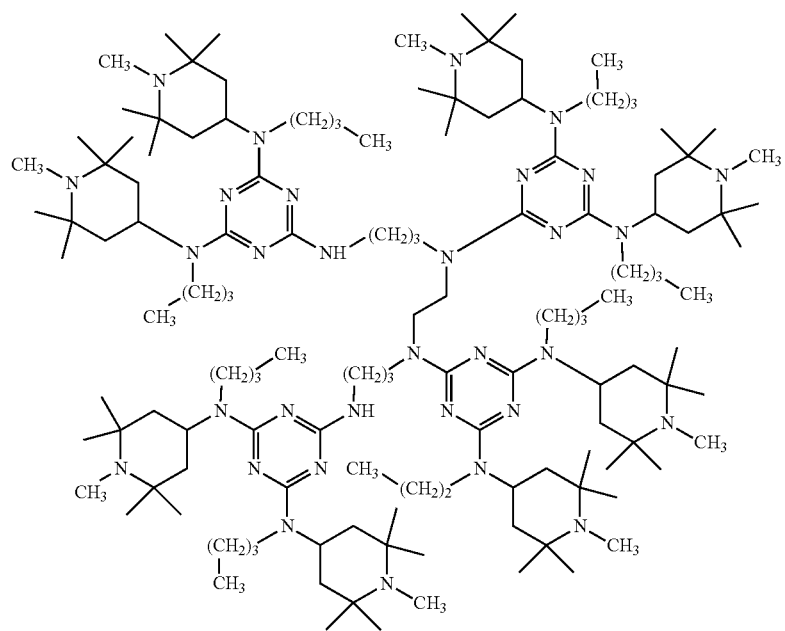

Preferred oligomeric and polymeric hindered amines have the following structures:
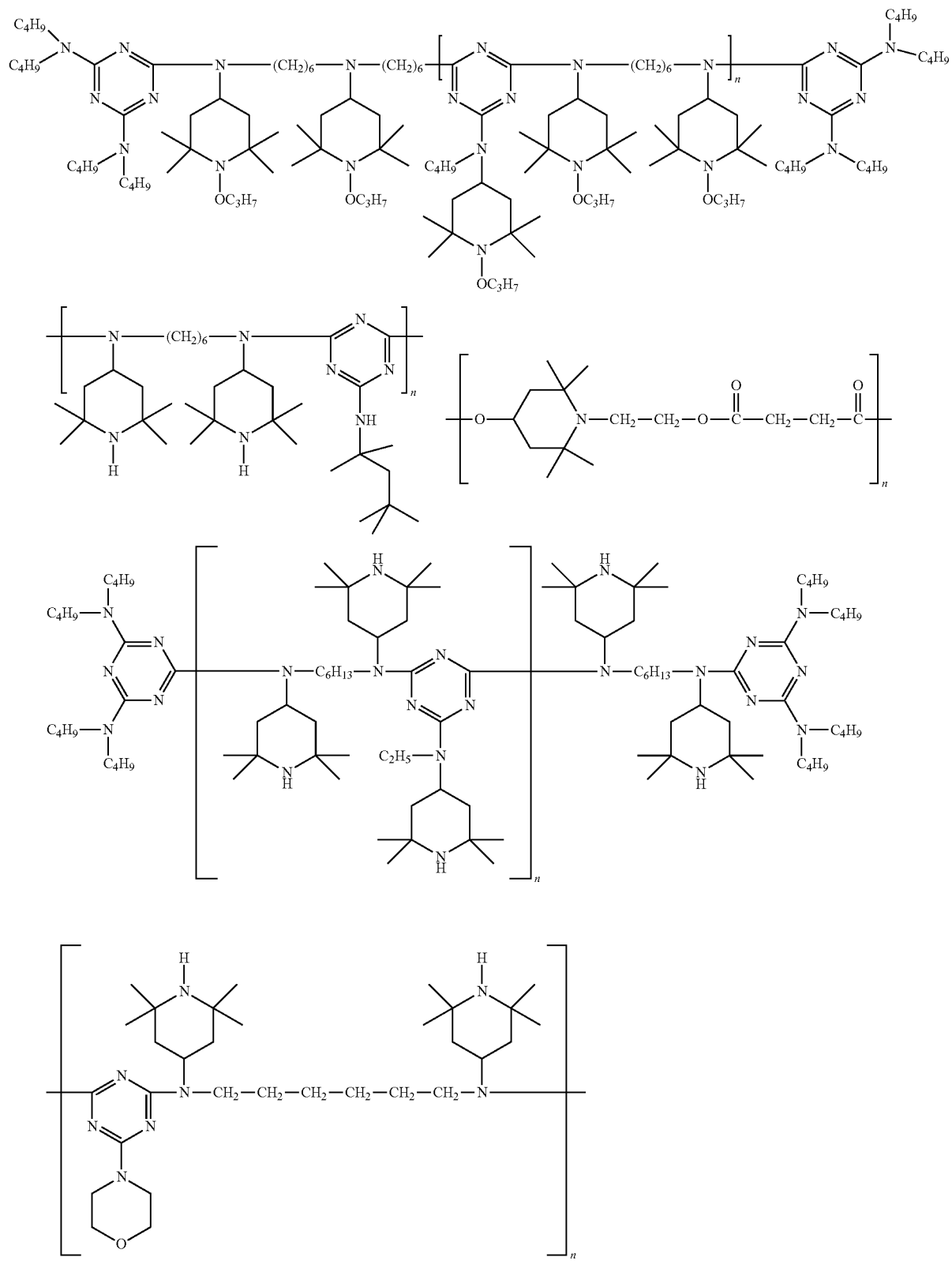

-continued

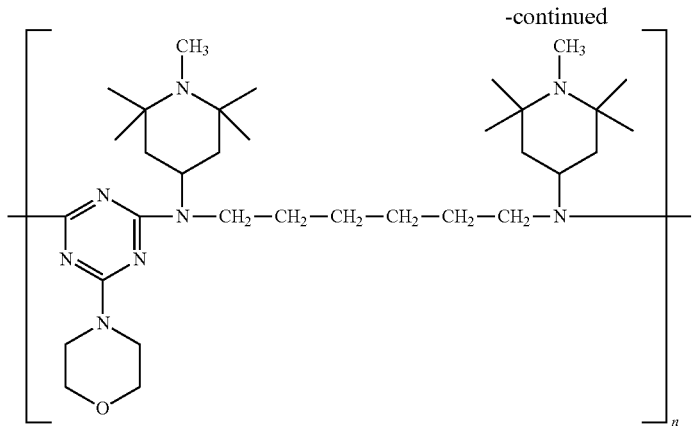
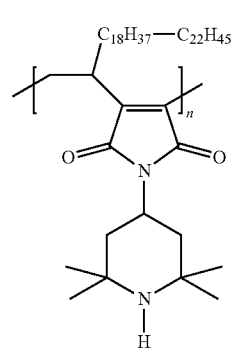
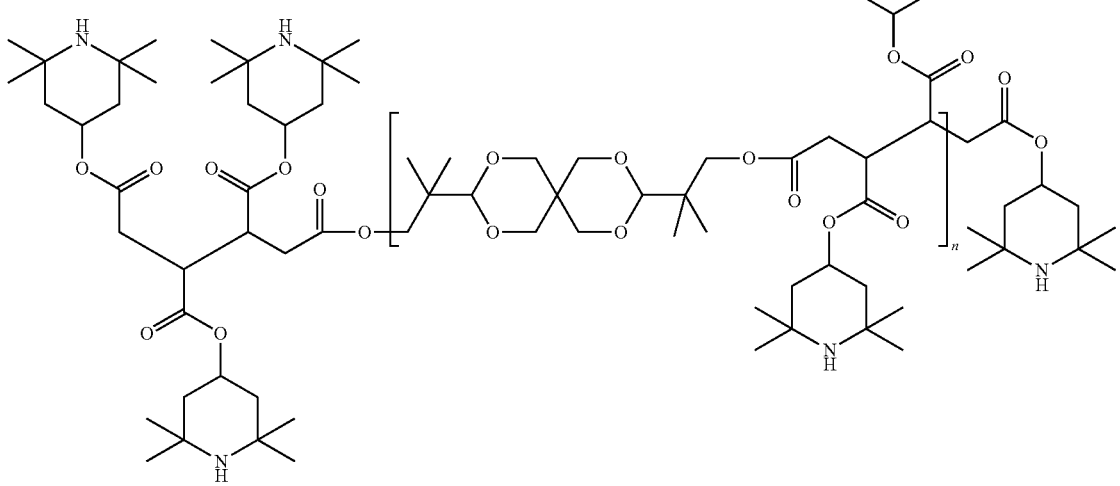
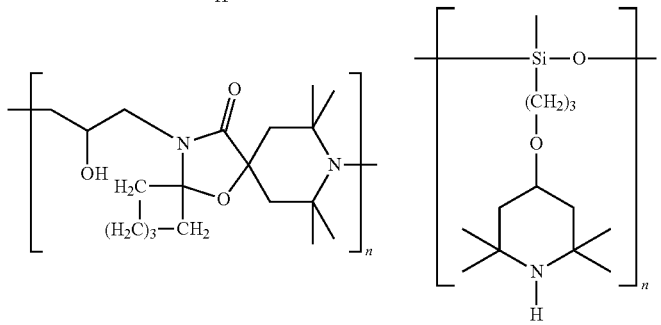

In the aforementioned compounds, n in each instance means 3 to 100.

Suitable dispersants are, for example:

polyacrylates, for example copolymers with long-chain side groups, polyacrylate block copolymers, alkyl amides: for example N,N'-1,2-ethanediylbisoctadecaneamide, sorbitan esters, for example monostearyl sorbitan esters, titanates and zirconates in each instance with long-chain substituents, reactive copolymers with functional groups, for example polypropylene-co-acrylic acid, polypropylene-co-maleic acid anhydride, polyethylene-co-glycidyl methacrylate, polystyrene-alt-maleic acid anhydride, polysiloxane: for example dimethylsilanediol-ethylene-oxide copolymer, polyphenylsiloxane copolymer, amphiphilic copolymers: for example polyethylene-block-polyethylene oxide, dendrimers, for example hydroxyl-group-containing dendrimers.

Suitable nucleation agents are, for example, talc, alkali or alkaline earth salts of mono- and polyfunctional carboxylic acids, such as benzoic acid, succinic acid, adipic acid, for example sodium benzoate, zinc glycerolate, aluminum hydroxy-bis(4-tert-butyl)benzoate, benzylidene sorbitols such as 1,3:2,4-bis(benzylidene)sorbitol or 1,3:2,4-bis(4-methylbenzylidene)sorbitol, 2,2'-methylene-bis-(4,6-di-tert-butylphenyl)phosphate, and trisamides and diamides such as trimesic acid tricyclohexylamide, trimesic acid tri(4-methylcyclo-hexylamide), trimesic acid tri(tert.butylamide), N,N',N"-1,3,5-benzene triyltris(2,2-dimethyl-propanamide) or 2,6-naphthalene dicarboxylic acid di-cyclohexylamide.

Suitable antinucleation agents are, for example, azine dyes, such as nigrosin, ionic liquids and/or lithium salts.

Suitable flame retardants are, for example:

a) inorganic flame retardants such as $Al(OH)_3$, $Mg(OH)_2$, $AlO(OH)$, $MgCO_3$, phyllosilicates such as montmorillonite or sepiolite, non-modified or organically modified, double salts, such as Mg-Al silicates, POSS (Polyhedral Oligomeric Silsesquioxane) compounds, huntite, hydromagnesite or halloysite and $Sb_2O_3$ (ATO), $Sb_2O_5$, $MoO_3$, ammonium molybdate (AOM), zinc stannate, zinc hydroxystannate, b) Nitrogen-containing flame retardants, such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phosphate, and the corresponding pyrophosphates and polyphosphates, poly-[2,4-(piperazin-1,4-yl)-6-(morpholin-4-yl)-1,3,5-triazine], ammonium polyphosphate, melamine borate, melamine hydrobromide, c) radical formers, such as alkoxyamines, hydroxylamine esters, azo compounds, sulfene amides, sulfene imides, dicumyl or polycumyl, hydroxyimide and derivatives thereof such as hydroxyimide esters or hydroxyimide ethers, d) phosphorous flame retardants such as red phosphorus, phosphates such as resorcinol diphosphate, bisphenol-A-diphosphate and their oligomers, triphenylphosphate, ethylene diamine diphosphate, phosphinates such as salts of the hypophosphorous acid and their derivatives such as alkylphosphinate salts such as diethylphosphinate aluminum or diethylphosphinate zinc or aluminum phosphinate, aluminum phosphite, aluminum phosphonate, phosphonate esters, oligomeric and polymeric derivatives of methane phosphonic acid, 9,10-dihydro-9-oxa-10-phosphorylphenanthrene-10-oxide (DOPO) and their substituted compounds, e) halogen-containing flame retardants based on chlorine and bromine such as polybrominated diphenyl oxides, such as decabromodiphenyl oxide, tris(3-bromo-2,2-bis(bromomethyl)propyl phosphate, tris(tribromoneopentyl)phosphate, tetrabromophthalic acid, 1,2-bis(tribromophenoxy)ethane, hexa bromocyclododecane, brominated diphenylethane, tris-(2,3-dibromopropyl) isocyanurate, ethylene-bis(tetrabromophthalimide), tetrabromo-bisphenol A, brominated polystyrene, brominated polybutadiene or polystyrene-brominated polybutadiene copolymers, brominated polyphenylene ether, brominated epoxy resin, polypentabromobenzylacrylate, brominated polycarbonate optionally in combination with $Sb_2O_3$ and/or $Sb_2O_5$, f) borates, such as zinc borate or calcium borate, optionally on carrier material such as silica g) sulfurous compounds, such as elemental sulfur, disulfides and polysulfides, thiuram sulfide, dithiocarbamates, mercaptobenzothiazole and sulfene amides, h) antidrip means, such as polytetrafluoroethylene, i) silicon-containing compounds, such as polyphenyl siloxanes, j) carbon modifications, such as carbon nanotubes (CNTs), expandable graphite or graphene k) and combinations or mixtures hereof.

Suitable fillers and reinforcements are, for example, synthetic or natural materials, such as calcium carbonate, silicates, glass fibers, glass beads (solid or hollow), talc, mica, kaolin, barium sulfate, metal oxides and metal hydroxides, carbon black, graphite, carbon nanotubes, graphene, wood flour or fibers of natural products, such as cellulose or synthetic fibers such as polyester or polyamide fibers. Further suitable fillers are hydrotalcites or zeolites or phyllosilicates such as montmorillonite, bentonite, beidelite, mica, hectorite, saponite, vermiculite, ledikite, magadite, illite, kaolinite, wollastonite, attapulgite.

Suitable pigments may be inorganic or organic. Inorganic pigments are, for example, titanium dioxide, zinc oxide, zinc sulfide, iron oxide, ultramarine, carbon black, organic pigments are, for example, anthraquinones, anthanthrones, benzimidazolones, quinacridones, dketopyrrolopyrrols, dioxazines, indanthrones, isoindolinones, azo compounds, perylenes, phthalocyanines or pyranthrones. Further suitable pigments are effect pigments based on metal or pearlescent pigments based on metal oxide.

Suitable chain extenders for the linear increase in molecular weight of polycondensation polymers such as polyesters or polyamides are, for example, diepoxides, bis-oxazolines, bis-oxazolones, bis-oxazines, diisocyanates, dianhydrides, bis-acyllactams, bis-maleimides, dicyanates, carbodiimides or polycarbodiimides. Further suitable chain extenders are polymeric compounds such as polystyrene-polyacrylate-polyglycidyl(meth)acrylate copolymers, polystyrene-maleic acid anhydride copolymers and polyethylene-maleic acid anhydride copolymers.

Suitable optical brighteners are, for example, bisbenzoxazoles, phenylcoumarins or bis(styryl)biphenyls and in particular optical brighteners of the formulas:

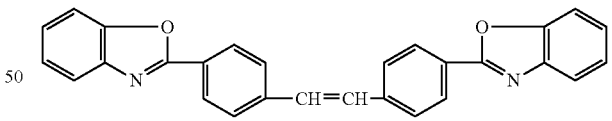

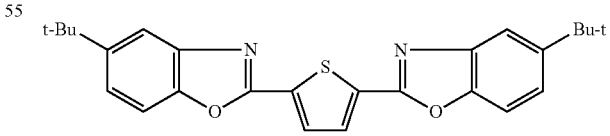

Suitable filler deactivators are, for example, polysiloxanes, polyacrylates, in particular block copolymers such as polymethacrylic acid-polyalkylene oxide or polyglycidyl (meth)acrylates and copolymers thereof for example with styrene and epoxides for example of the following structures:

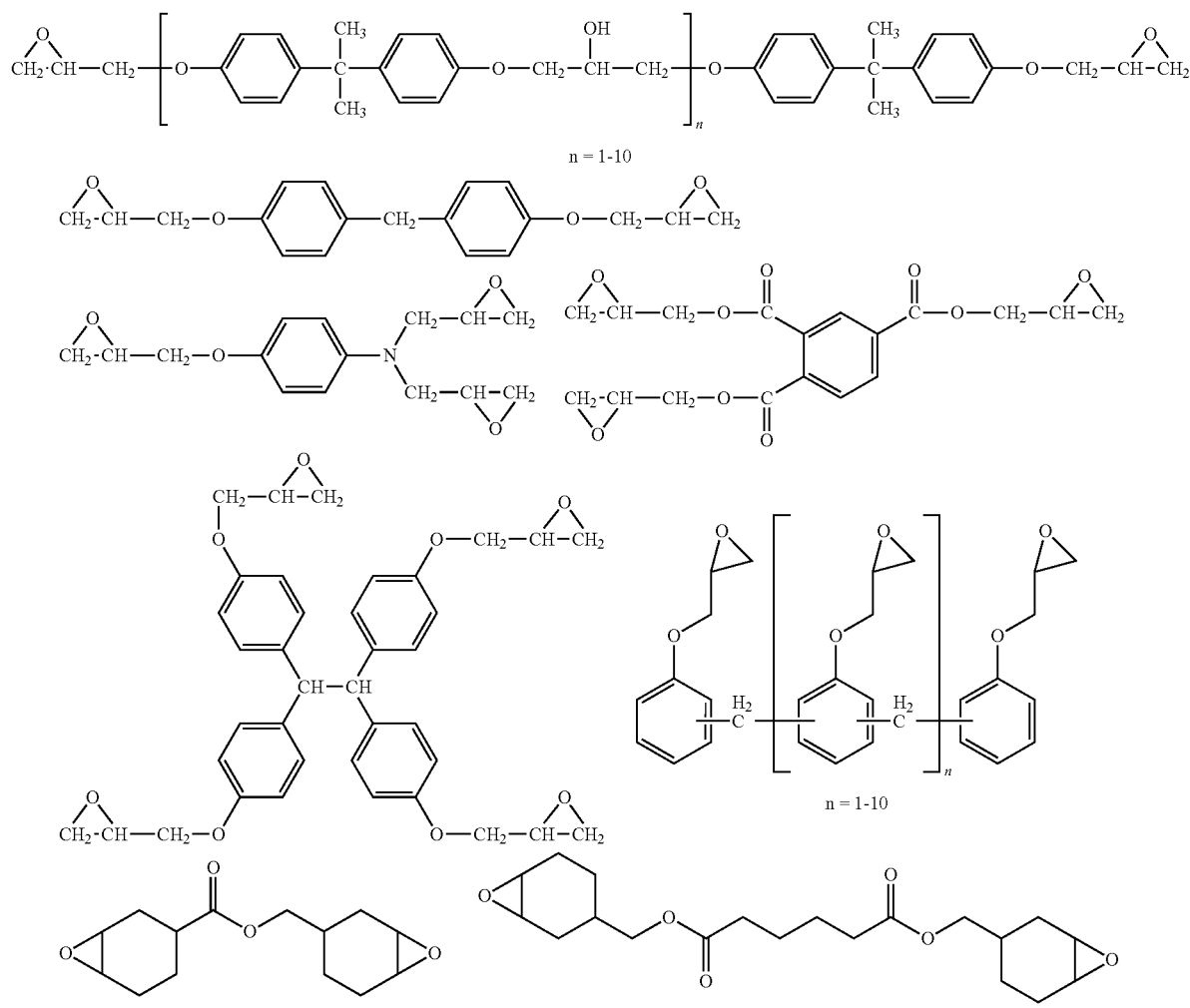

Suitable antistatic agents are, for example, ethoxylated alkylamines, fatty acid esters, alkyl sulfonates, and polymers such as polyether amides.

Suitable antiozonants are the above-mentioned amines, such as N,N'-di-isopropyl-p-phenylene diamine, N,N'-di-sec-butyl-p-phenylene diamine, N,N'-bis(1,4-dimethylpentyl)-p-phenylene diamine, N,N'-dicyclohexyl-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine.

Suitable electrically conductive additives are the already mentioned antistatic agents and additionally electrically conductive fillers such as carbon black, graphene, carbon nanotubes (CNTs), metal powders such as copper or silver, but also conductive polymers such as polyanilines, polypyrrol or polythiophenes.

Suitable thermally conductive additives are, for example, aluminosilicates, aluminum nitride or boron nitride.

Suitable odor scavengers are, for example, inorganic absorption agents such as zeolites, hydrotalcites, silicates or organic complexing or reactive compounds such as zinc ricinoleate or epoxides.

Suitable markers are, for example, fluorescence dyes, rare earths or anti-stokes crystals such as yttrium oxysulfides, gadolinium oxysulfides or cerium-tantalum oxides which are doped with rare earths such as erbium or ytterbium and show luminescence under IR radiation. These markers may be added in small ppm amounts to the polymers or to the additive in order to identify, for example, the manufacturer.

Suitable demolding agents are, for example, montan wax.

The incorporation of the components (A) and (B) and also optionally of the additional additives into the recycled plastic may be achieved by routine processing methods, wherein the polymer is melted and is mixed with the additive composition according to the invention and with the optionally further additives, preferably by mixer, kneader and extruder. Extruders, such as single-screw extruders, twin-screw extruders, planetary gear extruders, ring extruders, co-kneaders, are preferred processing machines and are preferably equipped with a vacuum degassing means. The processing may be performed under air or optionally under inert gas conditions, such as under nitrogen.

The present invention also relates to a plastics composition containing or consisting of
(A) at least one polyphenol,
(B) at least one alditol and/or one cyclitol,
(C) at least one virgin thermoplastic material or mixtures hereof.

In a preferred embodiment the plastics composition is characterized in that the plastics composition contains or consists of (A) 0.02 to 3.0 parts by weight, preferably 0.06 to 1.0 parts by weight of at least one polyphenol,
(B) 0.02 to 3.0 parts by weight, preferably 0.03 to 0.5 parts by weight of at least one alditol and/or at least one cyclitol, and
(C) 94.0 to 99.96 parts by weight, preferably 98.5 to 99.91 parts by weight of a virgin thermoplastic material or mixtures hereof,
so that (A), (B) and (C) together give 100%.

The composition according to the invention preferably contains at least one primary antioxidant and at least one secondary antioxidant, however, it is also possible that the composition according to the invention is free from the further primary and/or secondary antioxidants.

With regard to the usable polyphenols, alditols and/or cyclitols and mixing ratios thereof, reference is made to the above comments in conjunction with the method according to the invention, which also apply fully for the plastics composition according to the invention. This applies accordingly for the usable plastics of the virgin plastics material.

In accordance with a further preferred embodiment the plastics composition according to the invention additionally contains at least one additive which is selected from the group consisting of UV absorbers, light stabilizers, metal deactivators, filler deactivators, antiozonants, nucleation agents, antinucleation agents, impact modifiers, plasticizers, lubricants, rheology modifiers, thixotropy agents, chain extenders, optical brighteners, antimicrobial active substances, antistatic agents, slip agents, antiblocking agents, coupling means, crosslinking agents, anticrosslinking agents, hydrophilizing agents, hydrophobing agents, adhesion promoters, dispersants, compatibilizers, oxygen scavengers, acid scavengers, propellants, degradation additives, antifoaming agents, odor scavengers, markers, antifogging agents, fillers, reinforcements, and mixtures hereof.

It is furthermore preferred that the plastics composition additionally contains at least one additive which is selected from the group consisting of
a) acid scavengers, preferably calcium stearate, magnesium stearate, zinc stearate, aluminum stearate, calcium stearate, calcium lactate, calcium stearoyl-2-lactate, hydrotalcites, in particular synthetic hydrotalcites based on aluminum, magnesium and zinc, hydrocalumites, zeolites, alkaline earth oxides, in particular calcium oxide and magnesium oxide, zinc oxide, alkaline earth carbonates, in particular calcium carbonate, magnesium carbonate and dolomite, and hydroxides, in particular brucite,
b) light stabilizers, preferably light stabilizers from the group of hindered amines,
c) dispersants,
d) filler deactivators, and
mixtures hereof.

The plastics composition according to the invention is preferably producible or has been produced by a method according to the invention for stabilizing virgin thermoplastics material against oxidative, thermal and/or actinic degradation.

A further preferred embodiment of the plastics composition according to the invention is characterized in that the at least one secondary antioxidant is selected from the group consisting of phosphorus compounds, in particular phosphites and phosphonites, organosulfur compounds, in particular sulfides and disulfides, and mixtures hereof.

The phosphite tris-(2,4-di-tert-butylphenyl)phosphite is particularly preferably contained as secondary antioxidant in the plastics composition according to the invention.

The present invention also relates to a molding compound or a molding that is producible from a plastics composition according to the invention, in particular in the form of injection-molded parts, foils, films, paints, coatings, foams, fibers, cables, pipes, profiles, hollow bodies, tapes, membranes, for example geomembranes and/or adhesives, which are produced by extrusion, injection molding, blow molding, calendering, pressing processes, spinning processes, painting, dipping and/or rotational molding, for example for the electrics industry, for the construction industry, for the transport industry, for medical applications, for domestic and electrical appliances, for vehicle parts, for mechanical engineering, for agricultural applications, for medical technology, for consumer items, for sports items, for packaging, for furniture and/or for textiles.

The present invention furthermore relates also to a stabilizer composition for stabilizing virgin thermoplastic material against oxidative, thermal and/or actinic degradation, said composition consisting of
(A) at least one polyphenol, and
(B) at least one alditol and/or at least one cyclitol.

It is preferred here that component (A) and component (B) are present in a weight ratio of from 5:95 to 90:10, preferably from 10:90 to 90:10, particularly preferably from 20:80 to 80:20.

All preferred variants, exemplary embodiments and comments (for example with regard to possible components and additives to be used) already described with regard to the method according to the invention and with regard to the plastics composition according to the invention also apply similarly to the stabilizer composition according to the invention.

The present invention also relates to the use of a stabilizer composition containing or consisting of
(A) at least one polyphenol, and
(B) at least one alditol and/or at least one cyclitol
for stabilizing virgin thermoplastic material (thermoplastic virgin resins, thermoplastic pristine resins) against oxidative, thermal and/or actinic degradation.

All preferred variants, exemplary embodiments and comments (for example with regard to possible components and additives to be used) already described with regard to the method according to the invention and with regard to the plastics composition according to the invention and with regard to the stabilizer composition according to the invention also apply similarly to the stabilizer composition according to the invention or to its use. The present invention will be explained in greater detail with reference to the following practical examples, without limiting the invention to the specially presented parameters.

3.4. EXAMPLES

Example 1

To examine the effect of the stabilizers according to the invention, a commercial polypropylene (Moplen HP 500N, Lyondell Basell Industries) was homogenized in a powder-powder mixture with the stabilizers stated in Table 2 and was circulated in a twin-screw microextruder (MC 5, manufacturer DSM) for 30 minutes at 200° C. and 200 revolutions per minute and the decrease in the force was recorded. The force is a direct measure for the molecular weight of polypropylene: the smaller the decrease, the higher the stabilization effect.

TABLE 2

Stabilization of polypropylene

| | Stabilization | Residual force [%] after 10/20/30 minutes [[%][%] |
|---|---|---|
| Comparative example 1 | Without additive | 74/51/30 |
| Comparative example 2 (synthetic stabilization) | 0.1% A0-1 + 0.1% P-1 | 96/76/56 |
| Comparative example 3 (polyphenol) | 0.1% tannin | 79/61/41 |
| Comparative example 4 (alditol) | 0.1% erythritol | 70/49/32 |
| Example 1 according to the invention | 0.1% tannin + 0.1% erythritol | 99/91/65 |
| Example 2 according to the invention | 0.2% tannin + 0.2% erythritol | 99/98/96 |

A0-1: pentaerythritol-tetrakis [3-(3,5-di-tert-butyl-4-hydroxyphenyl)propionate P-1: tris-(2,4-di-tert-butylphenyl)phosphite The synergistic combination according to the invention proved in the present test to be superior to the synthetic commercial synergistic combinations of A0-1 and P-1 (comparative example 2), since a smaller degradation of the polymers occurs over the test period. The individual components, by contrast, have no or only a small effect, since the degradation of the polymers runs close to that of the polymer without additive.

Example 2

To further examine the effect of the stabilizers according to the invention, a commercial base-stabilized polypropylene (Moplen HP 500N, Lyondell Basell Industries) in the form of a granular material was homogenized with the powdered stabilizers stated in Table 3 and extruded and granulated in a 16 mm twin-screw extruder (PTW 16, manufacturer: Haake, L/D ratio: 20) at 210° C. maximum temperature and 140 revolutions/min. After extrusion, the MVR (230° C./2.16 kg) was measured in each instance according to DIN/ISO 1133.

TABLE 3

Stabilization of polypropylene: Extrusion

| Test no. | Additives | MVR [cm³/10 min] |
|---|---|---|
| Comparative example 5 | Without additive | 16.4 |
| Example 3 according to the invention | 0.2% tannin + 0.2% myo-inositol | 15.2 |
| Example 4 according to the invention | 0.4% tannin + 0.2% myo-inositol | 15.0 |
| Example 5 according to the invention | 0.2% tannin + 0.2% myo-inositol + 0.2% HALS (Sabostab UV 40) | 15.2 |
| Example 6 according to the invention | 0.2% tannin + 0.2% myo-inositol + 0.2% epoxidized soybean oil | 15.2 |
| Example 7 according to the invention | 0.2% tannin + 0.2% myo-inositol + 0.2% bisphenol-A-diglycidyl ether (Araldite GT 6071) | 14.9 |

Sabostab UV40 is a 1,6-hexane diamine, N,N'-bis(2,2,6,6-tetramethyl-4-piperidinyl)-polymer with 2,4,6-trichloro-1,3,5-triazine, and the reaction product with N-butyl-1-butane amine and N-butyl-2,2,6,6-tetramethyl-4-piperidine amine of the following formula:

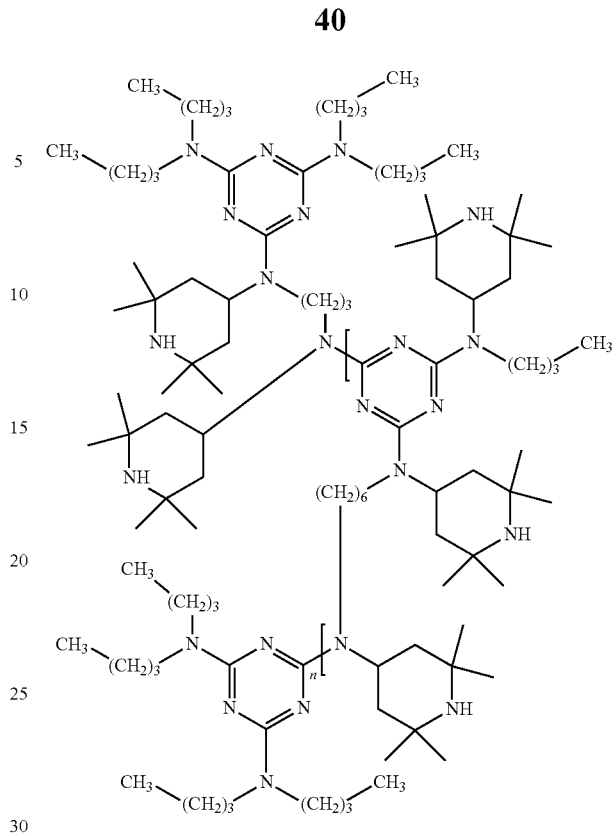

Araldite GT 6071 is a trade product from the company Huntsman.

Compared to the comparative examples, the examples according to the invention have, during the processing, a lower MVR, i.e. a smaller degradation and thus an improved processing stability.

Example 3

To further examine the effect of the stabilizers according to the invention, a commercial polypropylene (Moplen HP 500N, Lyondell Basell Industries, base-stabilized) in the form of a powder/powder mixture was homogenized with the stabilizers stated in Table 4 and extruded and granulated in a 11 mm twin-screw extruder (Process 11, manufacturer: Thermo Fisher, L/D ratio: 40) at 230° C. maximum temperature and 200 revolutions/min. After extrusion, the MVR (230° C./2.16 kg) was measured in each instance according to DIN/ISO 1133.

TABLE 4

Stabilization of polypropylene: Extrusion

| Test no. | Additives | MVR [cm³/10 min] |
|---|---|---|
| Comparative example 6 | Without additive, base-stabilized | 18.4 |
| Comparative example 7 | 0.1% calcium stearate | 18.3 |
| Comparative example 8 | 0.2% erythritol + 0.1% calcium stearate | 17.6 |
| Example 8 according to the invention | 0.1% tannin + 0.1% erythritol + 0.1% calcium stearate | 15.5 |
| Example 9 according to the invention | 0.2% tannin + 0.2% erythritol + 0.1% calcium stearate | 14.1 |

TABLE 4-continued

Stabilization of polypropylene: Extrusion

| Test no. | Additives | MVR [cm³/10 min] |
|---|---|---|
| Example 10 according to the invention | 0.2% tannin + 0.2% erythritol + 0.1% calcium stearate + 0.2% tris(2,4-di-tert-butylphenyl)phosphite | 14.0 |
| Example 11 according to the invention | 0.2% tannin + 0.2% myo-inositol + 0.1% calcium stearate | 15.0 |
| Example 12 according to the invention | 0.4% tannin + 0.2% erythritol + 0.1% calcium stearate | 13.6 |
| Example 13 according to the invention | 0.2% octyl gallate + 0.2% erythritol + 0.1% calcium stearate | 13.6 |
| Example 14 according to the invention | 0.2% tannin + 0.2% erythritol + 0.1% calcium stearate + 0.2% HALS (Sabostab UV 40) | 14.1 |
| Example 15 according to the invention | 0.4% octyl gallate + 0.2% erythritol + 0.1% calcium stearate | 13.6 |

Compared to the comparative examples, the examples according to the invention have, during the processing, a lower MVR, i.e. a smaller degradation and thus an improved processing stability.

Example 4

To examine the effect of the stabilizers according to the invention, a commercial polylactic acid (PLA, Luminyl L130, manufacturer, Corbion-Purac) after pre-drying (90° C., 70 hours) was homogenized in a powder-powder mixture with the stabilizers stated in Table 5 and was circulated in a twin-screw microextruder (MC 5, manufacturer DSM) for 30 minutes at 210° C. and 200 revolutions per minute and the decrease in the force was recorded. The force is a direct measure for the molecular weight of PLA: the smaller the decrease, the higher the stabilization effect.

TABLE 5

Stabilization of polylactic acid

| Test number | Stabilization | Residual force after 30 minutes [%] |
|---|---|---|
| Comparative example 9 | Without additive | 77 |
| Example 16 according to the invention | 0.1% tannin + 0.1% erythritol | 87 |

The synergistic combination according to the invention shows a significant stabilization effect, since a smaller degradation, i.e. a higher residual force, is detected.

Similarly to the stabilization of polylactic acid, tests were performed with polybutylene succinate, polybutylene terephthalate, crystal polystyrene, HD-polyethylene, polyamide-6 and ABS. In all cases, a corresponding stabilization effect was shown in comparison to the starting polymers.

Example 5

The granular material from comparative examples 6, 7 and 8, and also the examples according to the invention 10, 11 and 12 were stored at 150° C. for 5 days in a circulating air oven and the MVR was measured in accordance with DIN/ISO 1133. It was shown that, compared to the comparative examples, the compositions according to the invention have a smaller MVR increase, i.e. improved preservation of the molecular weight and thus an improved long-term heat stability. The results are shown in Table 6.

TABLE 6

Long-term thermal aging

| Test number | MVR after production [cm³/10 min] | MVR after aging [cm³/10 min] |
|---|---|---|
| Comparative example 6 | 18.4 | greater than 200 |
| Comparative example 7 | 18.3 | greater than 200 |
| Comparative example 8 | 17.6 | 29.8 |
| Example 10 according to the invention | 14.0 | 15.6 |
| Example 11 according to the invention | 15.0 | 16.4 |
| Example 12 according to the invention | 13.6 | 16.6 |

Furthermore, example 7 according to the invention was stored for 504 hours at 150° C. in a circulating air oven; an unchanged MVR value of 15.0 [cm³/10 min] was recorded after the storage.

The invention claimed is:

1. A method for stabilizing virgin thermoplastic material against oxidative, thermal, and/or actinic degradation, comprising introducing
   (A) 0.02 to 3.0% by weight of a compound selected from the group consisting of gallic acid, esters of gallic acid, hydroxytyrosol, chrysin, quercetin, hesperidin, neohesperidin, naringin, morin, caempherol, fisetin, anthocyanin, carnosic acid, carnosol, rosmarinic acid, resveratrol, tannins, silymarin, and a combination thereof and
   (B) 0.02 to 3.0% by weight of at least one alditol and/or at least one cyclitol
   into 94.0 to 99.96% by weight of a virgin thermoplastic material;
   wherein graphene and carbon nanotubes are not introduced into the virgin thermoplastic material.

2. The method according to claim 1, wherein the anthocyanin is selected from the group consisting of delphinidin, malvidin, and combinations thereof.

3. The method according to claim 1, wherein the at least one alditol is of the empirical formula:
   $HOCH_2-[CH(OH)]_n-CH_2OH$,
   $R_1-OCH_2-[CH(OH)]_n-CH_2OH$, or
   $HOCH_2-[CH(OH)]_n-[CH(OR_1)]-CH_2OH$,
   wherein n=2-5 and $R_1$ is an optionally substituted sugar residue.

4. The method according to claim 1, wherein the at least one alditol is selected from the group consisting of threitol, erythritol, galactitol, mannitol, ribitol, sorbitol, xylitol, arabitol, isomalt, lactitol, and maltitol.

5. The method according to claim 1, wherein the at least one cyclitol is selected from the group consisting of inositol, quercitol, viscumitol, bornesitol, conduritol, ononitol, pinitol, pinpollitol, quebrachitol, quinic acid, shikimic acid, and valienol.

6. The method according to claim 1, wherein component (A) and component (B) are introduced into the virgin thermoplastic material in a % by weight ratio of from 5:95 to 90:10.

7. The method according to claim 1, wherein components (A) and (B) are introduced into the virgin thermoplastic material by mixing the components (A) and (B) with the virgin thermoplastic material present as a solid, and the resultant mixture is melted and cooled.

8. The method according to claim 1, wherein the virgin thermoplastic material is selected from the group consisting of:
- (a) polymers of olefins and polymers of diolefins,
- (b) polymers of styrene,
- (c) halogen-containing polymers,
- (d) polymers of unsaturated esters,
- (e) polymers of unsaturated alcohols and derivatives thereof,
- (f) polyacetals,
- (g) polyphenylene oxides, blends of polyphenylene oxides with polystyrene or polyamides, and blends of polyphenylene oxides with polyamides,
- (h) polymers of cyclic ethers,
- (i) polyurethanes of hydroxy-terminated polyethers and aromatic isocyanates, polyurethanes of hydroxy-terminated polyethers and aliphatic isocyanates, polyurethanes of hydroxy-terminated polyesters and aromatic isocyanates, and polyurethanes of hydroxy-terminated polyesters and aliphatic isocyanates,
- (j) polyamides,
- (k) polyimides, polyamide-imides, polyether imides, polyester imides, poly (ether) ketones, polysulfones, polyether sulfones, polyaryl sulfones, polyphenylene sulfide, polybenzimidazoles, polyhydantoins, and blends thereof,
- (l) polyesters of aliphatic dicarboxylic acids and diols, polyesters of hydroxy-carboxylic acids, and polyesters of aromatic dicarboxylic acids and diols,
- (m) polycarbonates (PC), polyester carbonates, and blends thereof,
- (n) cellulose derivatives,
- (o) difunctional epoxy compounds in combination with curing agents, and polyfunctional epoxy compounds in combination with curing agents,
- (p) phenol resins,
- (q) polyester resins of unsaturated dicarboxylic acids and diols with vinyl compounds,
- (r) silicones,
- (s) natural polymers, and
- (t) combinations of the aforementioned polymers.

9. A plastics composition comprising (A) at least one polyphenol, (B) at least one alditol and/or one cyclitol, and (C) at least one virgin thermoplastic material,
wherein:
- (A) is present in an amount of 0.02 to 3.0% by weight of a polyphenol selected from the group consisting of gallic acid, esters of gallic acid, hydroxytyrosol, chrysin, quercetin, hesperidin, neohesperidin, naringin, morin, caempherol, fisetin, anthocyanin, carnosic acid, carnosol, rosmarinic acid, resveratrol, tannins, and silymarin;
- (B) is present in an amount of 0.02 to 3.0% by weight of at least one alditol and/or one cyclitol; and
- (C) is present in an amount of 94.0 to 99.96% by weight; and wherein the plastics composition is free of graphene and carbon nanotubes.

10. The plastics composition according to claim 9, which further contains
at least one additive selected from the group consisting of UV absorbers, light stabilizers, metal deactivators, filler deactivators, antiozonants, nucleation agents, antinucleation agents, impact modifiers, plasticizers, lubricants, rheology modifiers, thixotropy agents, chain extenders, processing aids, demolding aids, flame retardants, pigments, dyes, optical brighteners, antimicrobial active substances, antistatic agents, thermally and/or electrically conductive additives, slip agents, antiblocking agents, coupling means, crosslinking agents, anticrosslinking agents, hydrophilizing agents, hydrophobing agents, adhesion promoters, dispersants, compatibilizers, oxygen scavengers, acid scavengers, propellants, degradation additives, antifoaming agents, odor scavengers, markers, antifogging agents, fillers, and reinforcements.

11. The plastics composition according to claim 9, which additionally contains at least one additive selected from the group consisting of acid scavengers, light stabilizers, dispersants, and filler deactivators.

* * * * *